United States Patent
Shin et al.

(10) Patent No.: US 9,829,577 B2
(45) Date of Patent: Nov. 28, 2017

(54) ACTIVE INDOOR LOCATION SENSING FOR MOBILE DEVICES

(71) Applicant: The Regents of The University of Michigan, Ann Arbor, MI (US)

(72) Inventors: Kang G. Shin, Ann Arbor, MI (US); Yu-Chih Tung, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 143 days.

(21) Appl. No.: 14/816,153

(22) Filed: Aug. 3, 2015

(65) Prior Publication Data
US 2016/0178748 A1    Jun. 23, 2016

Related U.S. Application Data

(60) Provisional application No. 62/094,132, filed on Dec. 19, 2014.

(51) Int. Cl.
G01S 15/00    (2006.01)
G01S 15/42    (2006.01)
G01S 15/46    (2006.01)
H04W 4/02    (2009.01)

(52) U.S. Cl.
CPC ............ *G01S 15/42* (2013.01); *G01S 15/46* (2013.01); *H04W 4/02* (2013.01)

(58) Field of Classification Search
CPC .................................. G01S 15/42; G01S 15/46
See application file for complete search history.

(56) References Cited

U.S. PATENT DOCUMENTS

| 6,357,389 B1 * | 3/2002 | March ...................... F03B 3/06 119/219 |
| 2011/0121965 A1 | 5/2011 | Betts et al. |
| 2014/0074469 A1 | 3/2014 | Zhidkov |
| 2014/0342666 A1 | 11/2014 | Choi et al. |

FOREIGN PATENT DOCUMENTS

| EP | 2772903 A1 | 9/2014 |
| WO | WO-0106401 A1 | 1/2001 |

OTHER PUBLICATIONS

Makoto Ono, et al "Touch & Activate: Adding Interactivity to Existing Objects Using Active Acoustic Sensing", UIST'13, (2013).
K. Kunze et al's "Symbolic Object Localization Through Active Sampling of Acceleration and Sound Signatures", UbiComp 2007, LNCS 4717, pp. 163-180 (2007).
M. Rossi et al's "RoomSense: An Indoor Positioning System for Smartphones Using Active Sound Probing", AH'13, Mar. 2013).

* cited by examiner

*Primary Examiner* — Hovhannes Baghdasaryan
(74) *Attorney, Agent, or Firm* — Harness, Dickey & Pierce, P.L.C.

(57) ABSTRACT

An active indoor location sensing technique is presented for smartphones and other types of mobile devices without requiring any additional sensors or pre-installed infrastructure. The main idea is to actively generate acoustic signatures by transmitting a sound signal with a phone's speakers and sensing its reflections with the phone's microphones. This active sensing achieves finer-grained control of the collected signatures than the widely-used passive sensing.

20 Claims, 19 Drawing Sheets

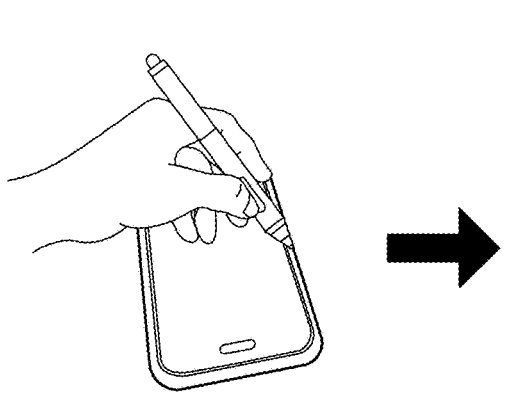
FIG. 1A
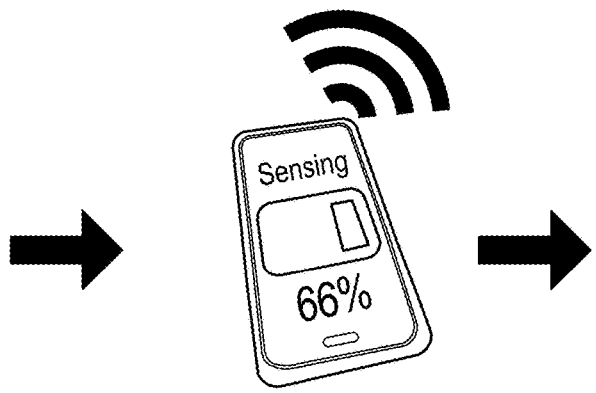
FIG. 1B
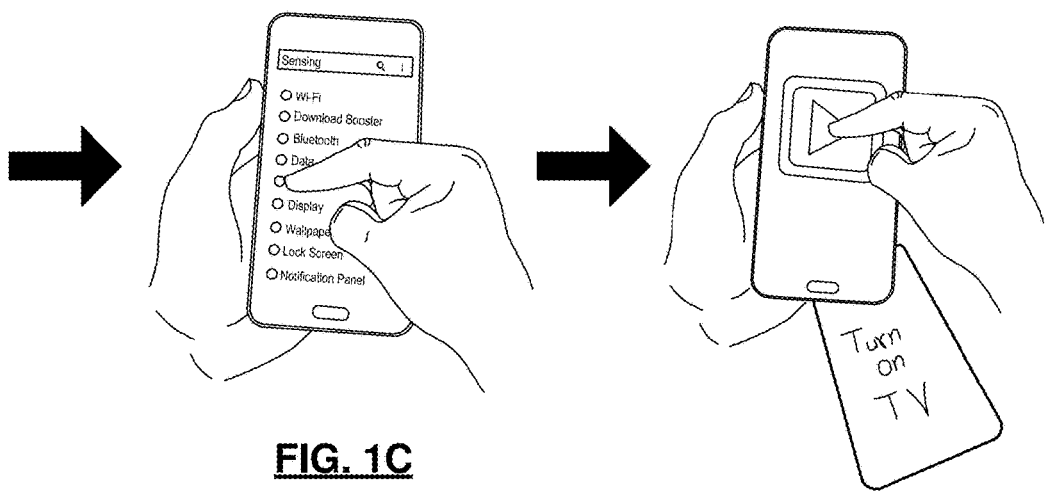
FIG. 1C
FIG. 1D

100% volume

5% volume

1% volume

Prediction confidence

Accuracy of C tag

ACTIVE INDOOR LOCATION SENSING FOR MOBILE DEVICES

CROSS-REFERENCE TO RELATED APPLICATIONS

This application claims the benefit of U.S. Provisional Application No. 62/094,132 filed on Dec. 19, 2014. The entire disclosure of the above application is incorporated herein by reference.

FIELD

The present disclosure relates to accurate active indoor location sensing technique for smartphones and other types of mobile devices.

BACKGROUND

Imagine one day—the silent mode of a phone is automatically activated in order to avoid disturbing a user's sleep when the phone is placed near the bed. Likewise, favorite songs are streamed to speakers whenever the phone is placed near a stereo or a predefined timer/reminder is set if the phone is near a medicine cabinet. This kind of applications is known as context-aware computing or indoor geofencing which provides a natural combination of function and physical location. However, such a function-location combination is still not pervasive because smartphones are yet unable to sense locations accurately enough without assistance of additional sensors or installed infrastructure.

Existing localization systems are restricted from providing this type of functionality for two reasons. First, they usually rely on passively recorded WiFi, FM, or background acoustic signals, and can hence only achieve about room-level or meter-level accuracy. Nevertheless, the above-mentioned applications need more accurate location sensing, e.g., both streaming music and setting silent mode might take place in the same room or even on the same table. Second, more accurate (i.e., with error of a few cm) location sensing with light recording or acoustic beacons requires a pre-installed infrastructure. The cost of such an infrastructure and the ensuing laborious calibrations make its realization expensive or difficult, especially for personal use.

In this disclosure, a location sensing system is introduced, called EchoTag, which enables phones to tag and remember indoor locations with finer than 1 cm resolution and without requiring any additional sensors or pre-installed infrastructure. The main idea behind this system is to actively render acoustic signatures by using phone speakers to transmit sound and phone microphones to sense its reflections. This active sensing provides finer-grained control of the collected signatures than the widely-used passive sensing. Moreover, this active sensing only relies on built-in sensors available in commodity phones, thus facilitating its deployment. This fine-grained location sensing technique can enable many important/useful applications that have not yet been feasible due to large sensing errors or lack of installed infrastructure.

This section provides background information related to the present disclosure which is not necessarily prior art.

SUMMARY

This section provides a general summary of the disclosure, and is not a comprehensive disclosure of its full scope or all of its features.

A method is provided for actively sensing location of a mobile device. The method includes: determining an approximate location of a mobile device using a location service residing on the mobile device; comparing the approximate location of the mobile device to one or more tagged locations stored by the mobile device, each tagged location includes an acoustic signature for the tagged location and a function to be performed at the tagged location; generating acoustic signals with a speaker of the mobile device, where the generation of acoustic signals occurs in response to the approximate location of the mobile device matching one of the tagged locations stored by the mobile device; recording sounds using a microphone of the mobile device and thereby create an acoustic signature for present location of the mobile device, where the recordation of sounds occurs in response to generating acoustic signals; comparing the acoustic signal for the present location of the mobile device with the acoustic signature associated with the tagged locations stored by the mobile device; and performing a given function associated with a given stored acoustic signature (e.g., placing the mobile device in silent mode), where the performing occurs in response to the acoustic signature for the present location of the mobile device matching the given stored acoustic signature.

The determination of an approximate location may include using an identifier for a wireless local area network to which the mobile device is paired with. The determination may also include determining orientation of the mobile device using an accelerometer residing in the mobile device.

In one embodiment, the generation of acoustic signals may include sweeping frequency of the acoustic signals generated by the speaker across a range of frequencies (e.g., in the range of 11 kHz to 22 kHz). The acoustic signal may also be generated with volume of the speaker set at five to ten percent of maximum volume of the speaker.

In some embodiments, the creation of an acoustic signature for the present location includes filtering the recorded sounds and thereby generate a filtered signal; identifying largest peak in the filtered signal; and truncating the filtered signal and thereby create an acoustic signal for present location of the mobile device, where the filtered signal is truncated prior to the largest peak identified in the filtered signal and is truncated after a predefined time period following the largest peak identified in the filtered signal. The duration of the predefined time period may be selected to exclude sound reflections from object outside a fixed distance from the mobile device.

In other embodiments, the method further includes presenting a message on a display of the mobile device, where the presentation occurs when the approximate location of the mobile device does not match on of the tagged locations stored by the mobile device.

In another aspect, the method for actively sensing location of a mobile device includes: generating acoustic signals with a speaker of the mobile device; recording sounds using a microphone of the mobile device, where the recordation of sounds occurs in response to generating acoustic signals; filtering the recorded sounds and thereby generate a filtered signal; identifying largest peak in the filtered signal; truncating the filtered signal and thereby create an acoustic signature for present location of the mobile device, where the filtered signal is truncated prior to the largest peak identified in the filtered signal and is truncated after a predefined time period following the largest peak identified in the filtered signal; comparing the acoustic signature for the present location of the mobile device one or more acoustic signatures stored by the mobile device; and performing a given function associated with a given acoustic signature, where the performing occurs in response to the acoustic signal for the present location matching the given acoustic signature and the given acoustic signature is one of the acoustic signatures stored by the mobile device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A-1D illustrate an example technique for tagging a location using a mobile device;

Corresponding reference numerals indicate corresponding parts throughout the several views of the drawings.

DETAILED DESCRIPTION

Example embodiments will now be described more fully with reference to the accompanying drawings.

FIGS. 1A-1D illustrate an example technique for tagging a location using a mobile device, such as a mobile phone. The first step is to place the phone at the target location and draw the contour of the phone with a pencil as seen in FIG. 1A. This contour is used as a marker for users to remember the location/area, which is called an (echo) tag. Tags can also be drawn on papers pasted on target locations. In some instances, it is not necessary to designate a tag. For example, if the phone is placed in a docking station or at another repeatable location which falls within the tolerance of the system.

Next, the phone generates and records the surrounding signatures at this target location as seen in FIG. 1B. With reference to FIG. 1C, the user then selects the functions to be performed and associated with this location. For example, the phone may be placed into silent mode when placed on a table next to a bed. Finally, the users can activate the selected functions by placing their phones back on the tagged location as shown in FIG. 1D. In summary, the system embeds an invisible trigger for perform one or more select functions at a tagged physical location.

Figure 2:
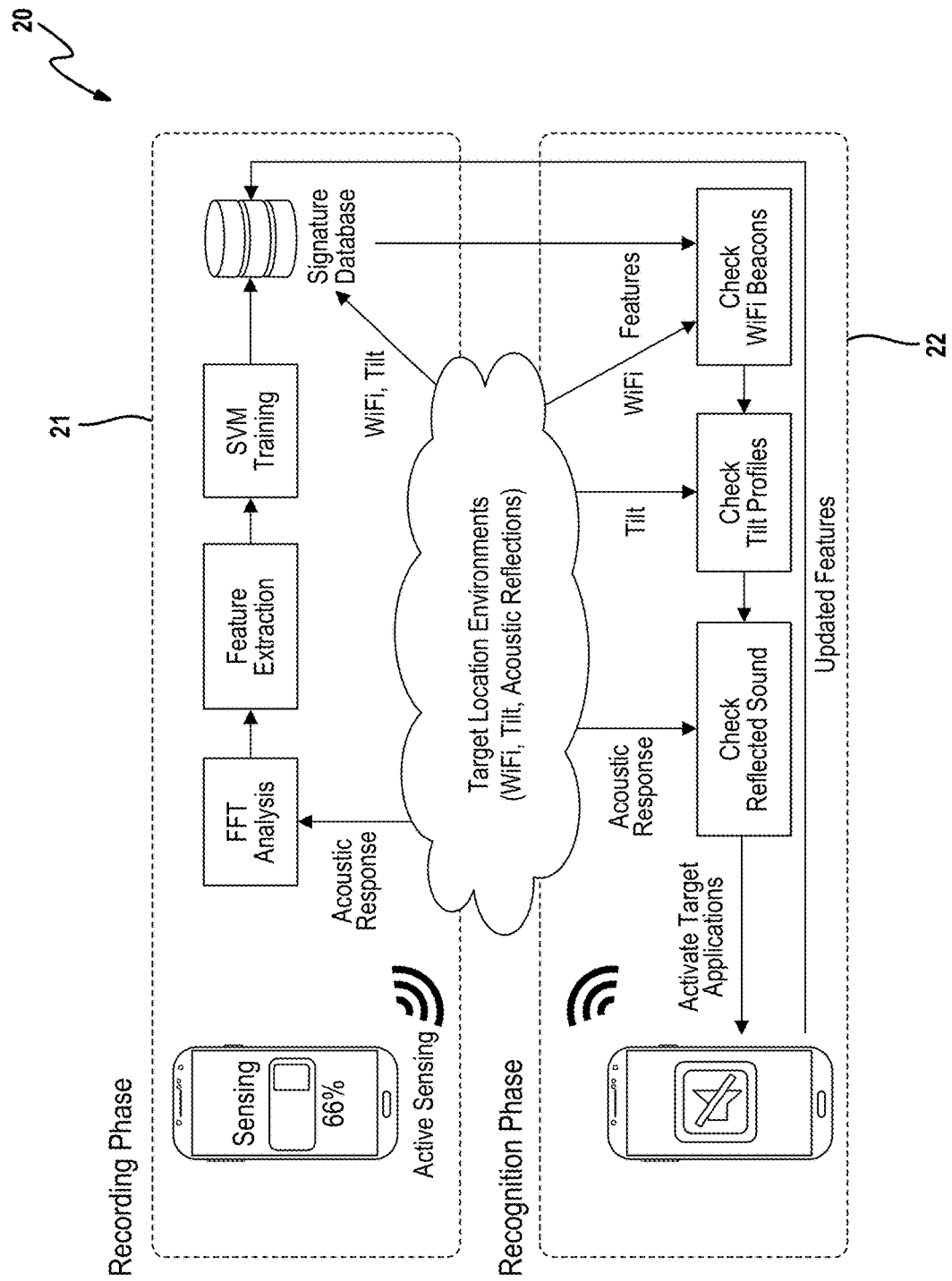
FIG. 2 is a diagram of an example location sensing system.

An overview of the location sensing system 20 is described in relation to FIG. 2. The location sensing system includes a recording phase 21 and recognition phases 22. In the recording phase, an acoustic signature is generated for a location being tagged. For example, multiple short sequences of sound signals can be emitted from the phone speakers. Each sequence is repeated a few times with different delays between left and right channels to enrich the received signatures as will be discussed in the following sections. The reading of built-in inertial sensors is also recorded for further optimization. After recording the signature, the signature along with selected functions are processed and saved in a database residing on the phone. In the recognition phase, the phone will continuously check if the approximate location of the phone matches one of the tagged locations. For example, the phone checks if the WiFi SSID and the tilt of the phone match one of the tagged locations. If the tilt and WiFi readings are similar to one of the recorded target locations, then the same acoustic sensing process is executed again to collect a signature for the present location of the phone. This new collected signature is compared with previous records in the database, for example using a support vector machine (SVM). If the results match, the target function will be automatically activated by the phone.

Figure 3A:
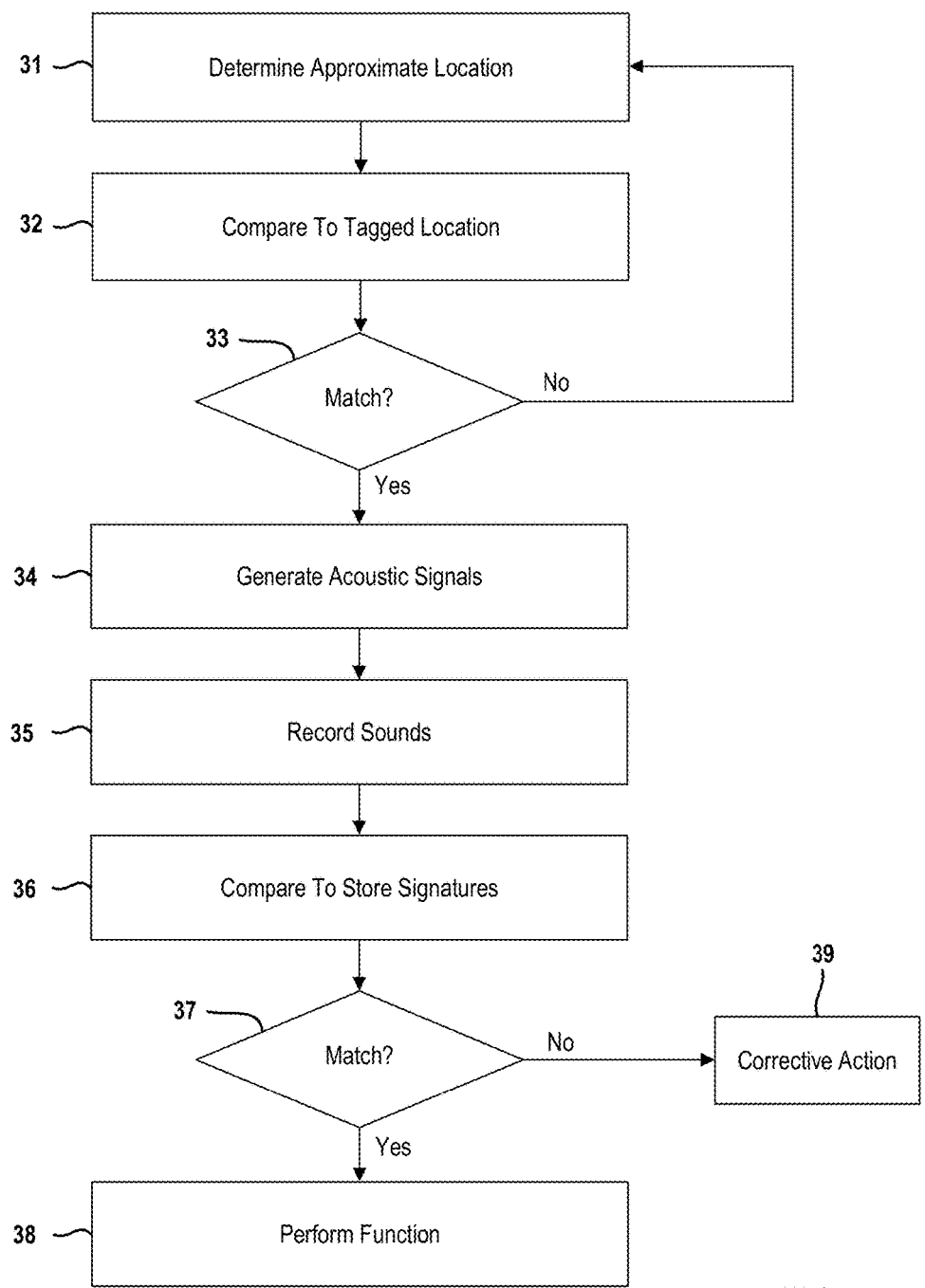
FIG. 3A is a flowchart of an example embodiment of a technique for actively sensing location.

FIG. 3 further depicts an example embodiment of this technique for actively sensing location. An approximate location of a mobile device is determined periodically at 31 using a location service residing on the mobile device. In one embodiment, the approximate location is determined using an identifier for a wireless local area network (e.g., WiFi SSID) to which the mobile device is paired with. In another embodiment, the approximate location is determined using a global positioning system. In either of these embodiments, the orientation (i.e., tilt) of the mobile device may also be determined, for example using an accelerometer in the mobile device. Other techniques for determining an approximate location also fall within the scope of the disclosure.

The approximate location is then compared at 32 to one or more tagged locations stored by the mobile device. Each tagged location includes an acoustic signature for the tagged location and a function to be performed at the tagged location. If the approximate location does not match one of the tagged locations, then this checking process is repeated periodically as indicated at 33. It is envisioned that this checking process may be trigger in other manner as well.

When the approximate location of the mobile device matches one of the tagged locations, acoustic signal are generated with a speaker of the mobile phone as indicated at 34. For example, if the WiFi SSIDs are the same and the orientation falls within a prescribed tolerance range, the approximate location is deemed to be a match. In one embodiment, acoustic signals are generated by a frequency sweep across a range of frequencies, for example in the range of 11 kHz to 22 kHz. Further techniques for generating acoustic signals are further described below.

In response to generating such acoustic sounds, sounds are recorded at 35 using a microphone of the mobile device. An acoustic signature for the present location of the mobile device can then be derived from the recorded sounds. In the example embodiment, the recorded sounds are filtered, for example using a matched filter. The largest peak is then identified in the filtered signal. To create an acoustic signature, the filtered signal is then truncated based on the timing of the largest peak. In particular, the filtered signal is truncated prior to the largest peak and truncated after a predefined time period following the largest peak. Duration of the predefined time period is preferably selected to exclude sound reflections from objects outside a fixed distance (e.g., one meter) from the mobile device. Further details for creating an acoustic signature is further described below.

Next, the acoustic signal for the present location of the mobile device is compared at 36 with the acoustic signature associated with one or more tagged locations stored by the mobile device. If the acoustic signature for the present location matches one of the acoustic signatures associated with a tagged location, the corresponding function associated with the tagged location is performed as indicated at 38. Exemplary functions include but are not limited to placing the mobile device is silent mode, playing a particular song or playlist, activating a special app, etc. In an example embodiment, the acoustic signatures are compared using a support vector machine although other types of classifiers are also contemplated by this disclosure.

Conversely, if the acoustic signature for the present location does not match one of the acoustic signatures associated with a tagged location, a corrective action may be taken as indicated at 39. For example, presenting a message on a display of the mobile device, where the message indicates there is no tag at the present location. Other types of corrective actions are also contemplated by this disclosure. It is to be understood that only the relevant steps of the methodology are discussed in relation to FIG. 3A, but that other software-implemented instructions may be needed to control and manage the overall operation of the system.

Figure 3B:
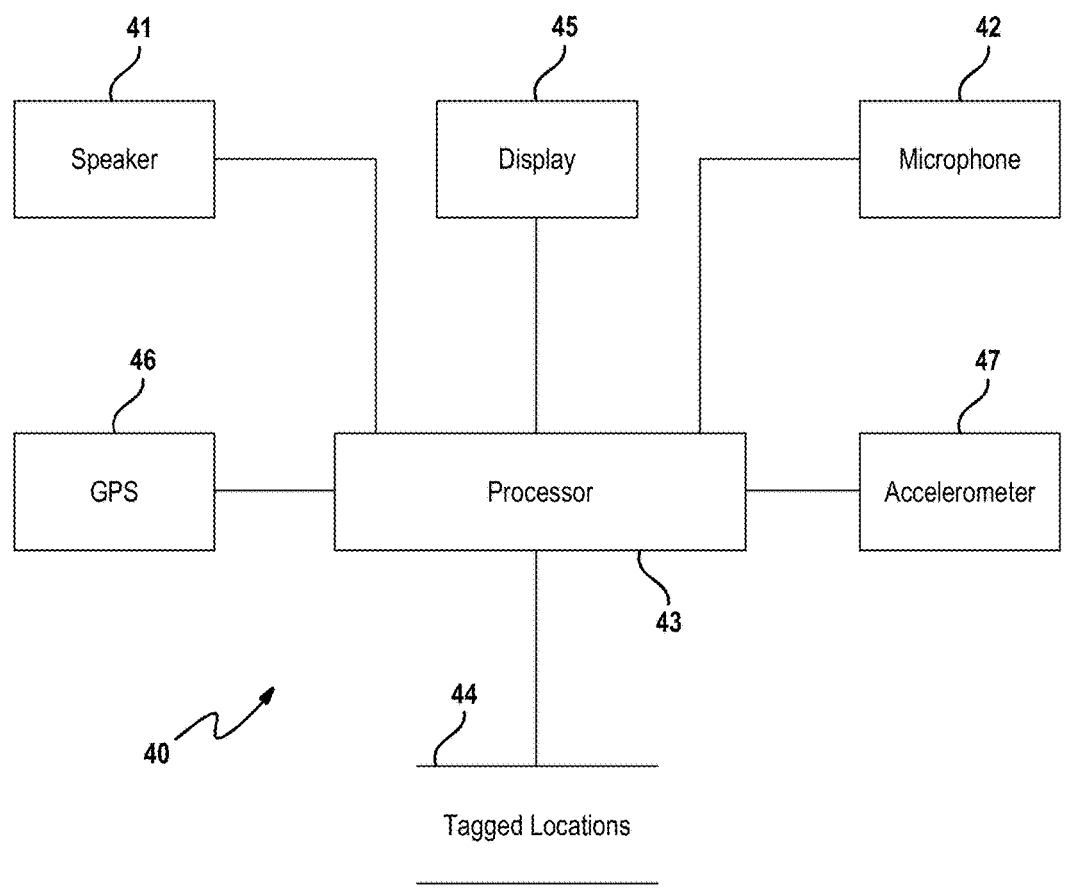
FIG. 3B is a block diagram of an example mobile device.
Figure 3C:
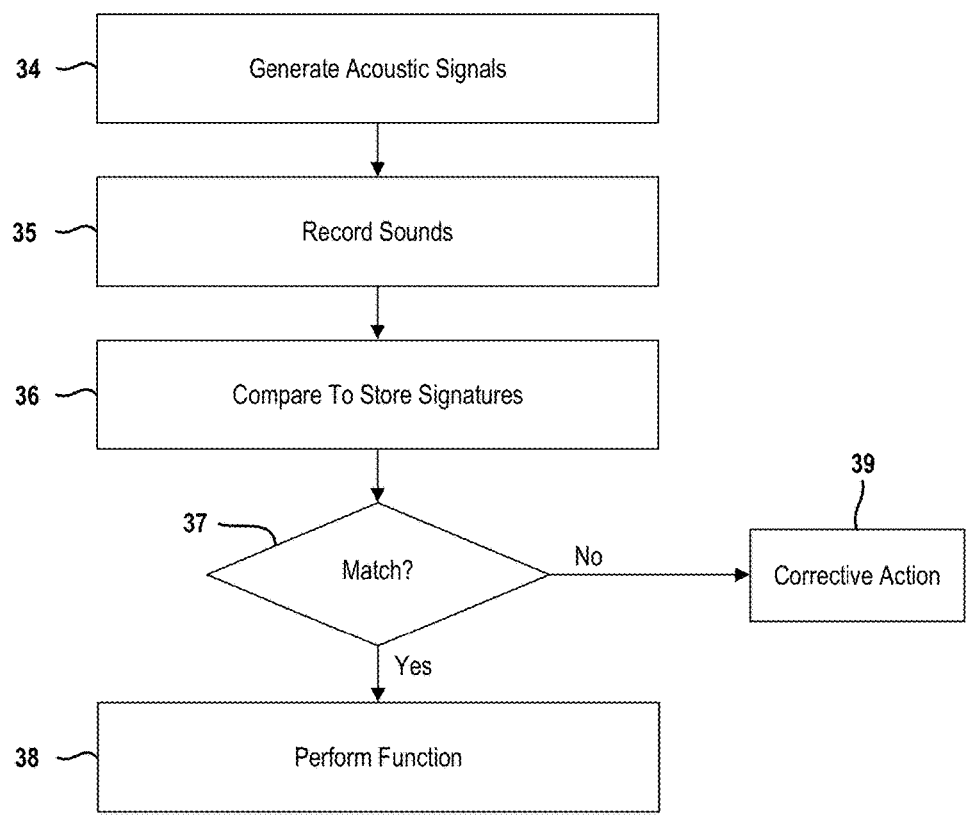
FIG. 3C is a flowchart of another embodiment of the technique for actively sensing location.

FIG. 3C depicts another embodiment of the technique for actively sensing location. In this embodiment, the steps for determining an approximate location of the mobile device are not performed (i.e., steps 31-33) but otherwise the steps for sensing location are the same as those described in relation to FIG. 3A.

FIG. 3B depicts an example mobile device 40. The mobile device 40 includes a speaker 41, a microphone 42 and a computer processor 43 as is commonly found in such devices. The mobile device 40 further includes a data store 44 for storing data, such as the data associated with the tagged locations. The mobile device 40 may include a display 45, an accelerometer 46 and/or a global positioning system 47. Techniques for actively sensing location of the device as set forth in this disclosure are implemented by the mobile device 40 without the needed for external sensors or pre-installed infrastructure. Although not limited thereto, example mobile devices include mobile phones, PDAs, laptops, and wearable devices (e.g., watches).

Figure 4:
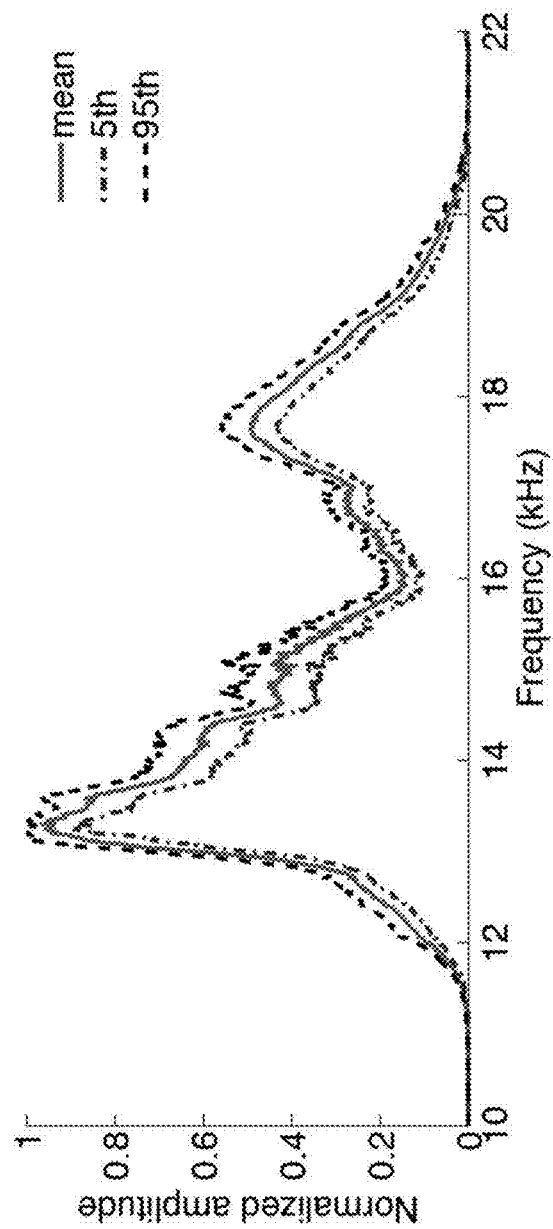
FIG. 4 is a diagram of an example acoustic signature generated by the location sensing system.
Figure 5A:
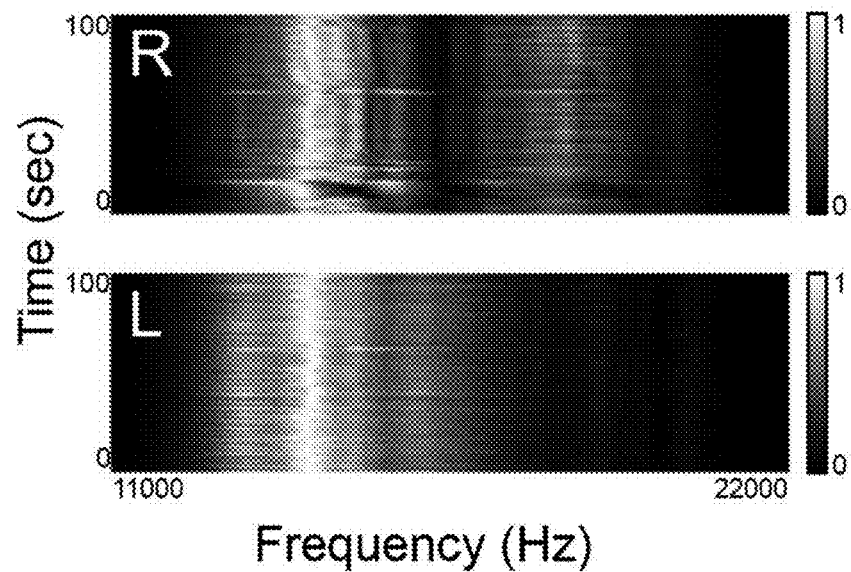
FIGS. 5A and 5B are graphs depicting frequency response of the acoustic signature in two different locations.
Figure 5B:
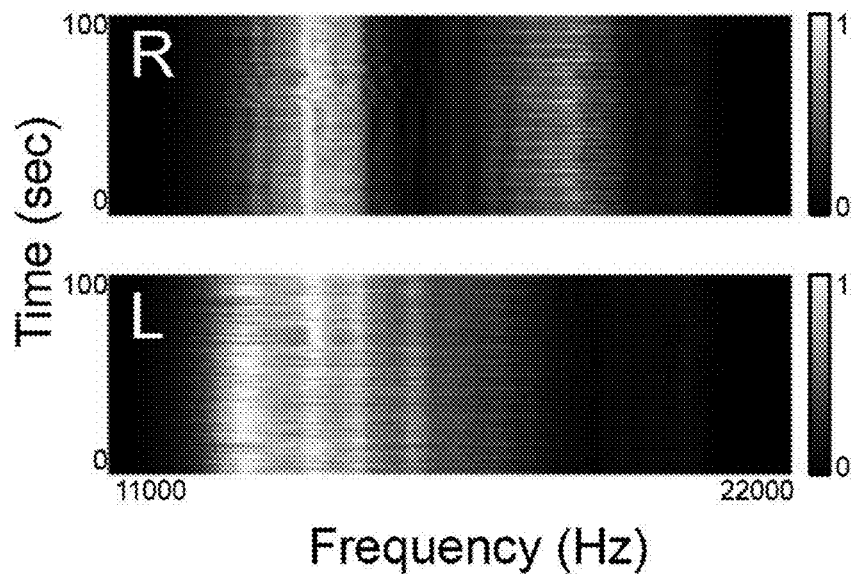

The location sensing system differentiates locations based on their acoustic signatures, characterized by uneven attenuations occurring at different frequencies as shown in FIG. 4. Note that the system does not examine the uneven attenuations in the background noise but those in the sound emitted from the phone itself. For example, as shown in FIG. 4, the recorded responses of a frequency sweep from 11 kHz to 22 kHz are not flat but have several significant degradations at some frequencies. The characteristics of this signature at different locations can be observed in FIG. 5 where the phone is moved 10 cm away from its original location. In what follows, the causes of this phenomenon determined as well as how to utilize this feature for accurate location tagging.

Figure 6:
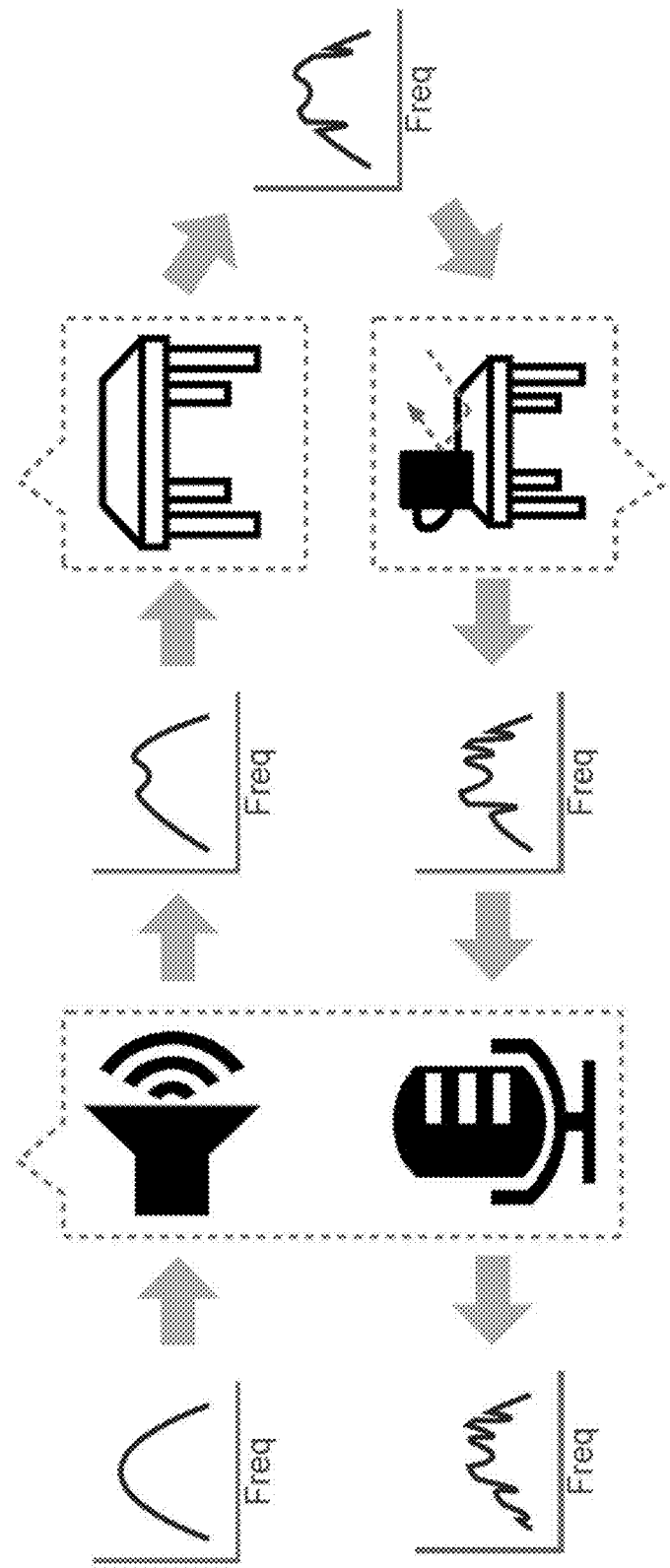
FIG. 6 is a diagram illustrating different causes of uneven attenuation of acoustic signatures.

Referring to FIG. 6, there are three main causes of this uneven attenuation: (a) hardware imperfection, (b) surface's absorption of signal, and (c) multipath fading caused by reflection. When sound is emitted from speakers, hardware imperfections make the signal louder at some frequencies and weaker at other frequencies. After the emitted sound reaches the surface touched by a phone, the surface material absorbs the signal at some frequencies. Different materials have different absorption properties, thus differentiating the surface on which the phone is placed. Then, when the sound is reflected by the touched surface and the surrounding objects, the combination of multiple reflections make received signals constructive at some frequencies while destructive at other frequencies. This phenomenon is akin to multipath (frequency-selective) fading in wireless transmissions. For example, if the reflection of an object arrives at microphones t milliseconds later than the reflection from the touched surface, then the signal component at $10^3/2t$ Hz frequency of both reflections will have opposite phases, thus weakening their combined signal. This multipath property of sound has been shown and utilized as a way to implement a ubiquitous keyboard interface. When reflections reach the phone's microphone, they will also degrade due to imperfect hardware design.

For the purpose of accurate location tagging, the proposed system mainly relies on the multipath fading of sound among the properties mentioned above as this is the only valid signature that varies with location even on the same surface. In what follows, the challenges of extracting this feature are introduced and how the proposed system meets the identified challenges is described in more detail.

The selection of parameters for the emitted sound is critical for the system to extract valid multipath signatures. According to the guideline for Android platforms, 44.1 kHz is the most widely supported sample rate for Android phones, so the highest frequency that can be sensed is about 22 kHz. Studies have shown that humans can hear signals of frequency up to 20 kHz and it is thus desirable to make the emitted sound inaudible (to avoid annoyance) by sensing 20 to 22 kHz. From preliminary experiments, it was found that the signal responses in this high-frequency range are not strong enough to support accurate indoor location tagging due to the imperfect hardware design that causes significant degradation of signal strength in this high-frequency range. For example, certain phones' microphones receive signals with 30 dB less strength at 22 kHz. This phenomenon is even worse if the degradation of speakers is accounted for. In one embodiment, it is preferable to chirp (i.e., frequency sweep) the emitted sounds from 11 kHz to 22 kHz to sense locations. The frequency response below 11 kHz is preferably not used since it contains mostly background noise of human activities. Even though this selection makes the sensing audible to humans, the impact of this selection is minimal because the system triggers acoustic sensing very infrequently, e.g., only when the tilt and the WiFi readings match its database as described above. Moreover, the annoyance caused by sensing with audible sounds can be mitigated via further processing, such as tuning the sound volume down to improve sensing accuracy. None of the 32 participants in a usability study deemed the emitted sound annoying and seven of them didn't even notice the emitted sound until they were asked to answer relevant questions. While reference has been made to a particular frequency range, it is readily understood that the different ranges fall within the broader aspects of this disclosure.

Figure 7:
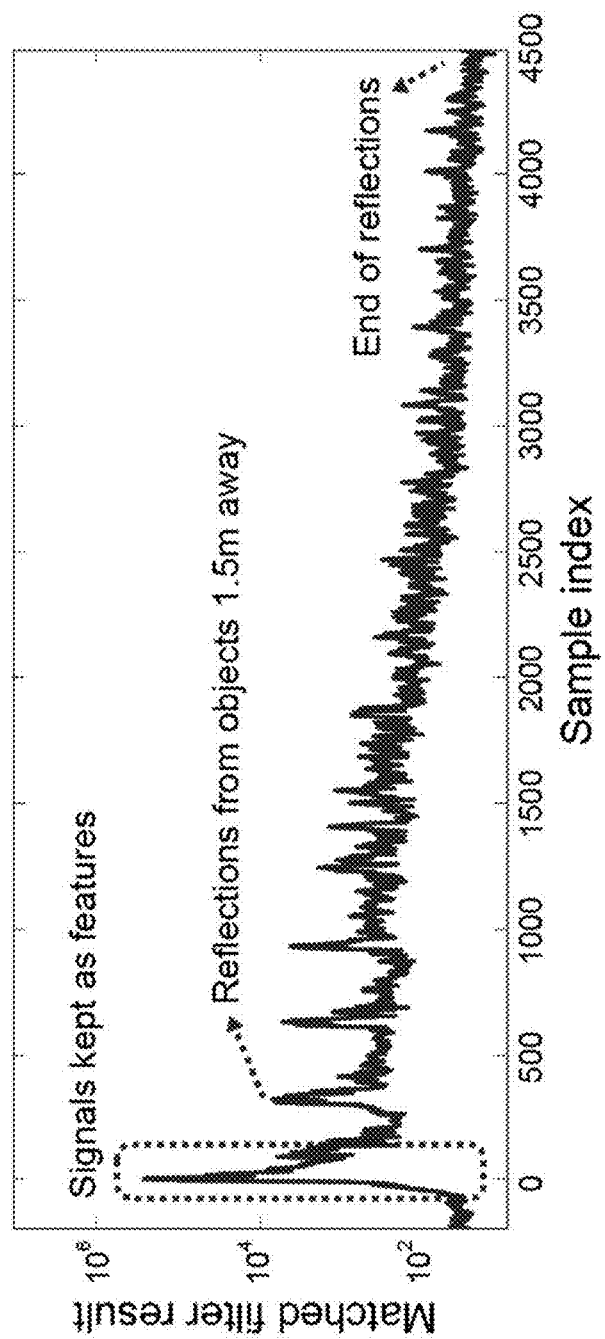
FIG. 7 is a graph depicting the signal received by a microphone of the mobile device and passed through a matched filter.

The length of the emitted sound, which is correlated with the signal-to-noise-ratio (SNR) of received signals, is also considered. The longer the sound of a frequency sweep, the more energy at each frequency is collected. However, a long duration of emitted sound introduces a problem to the functionality of the system because reflections from far-away objects are collected during this long duration of sensing. FIG. 7 shows the received signal passed by a matched filter, where the peaks indicate received copies of the emitted sound. The first and largest peak in this figure represents the sound directly traveled from the phone's speakers to microphones and the subsequent peaks represent the reception of environmental reflections. As the purpose of EchoTag is to remember a specific location for future use, it is unnecessary to collect signatures of reflections from far-away objects since those objects are likely to move/change. For example, an object 1.5 m away might be the reflection from the body of a friend sitting next to the user, and he might move away when the system is triggered to sense locations. One way to mitigate this problem is to truncate the signals generated by the reflections from far-away objects.

In one example embodiment, an acoustic signature is created by truncating the filter signal, such that the filtered signal is truncated prior to the largest peak and is further truncated after a predefined time period following the largest peak identified in the filtered signal. For example, the system uses 100-sample short signals for sensing and collects only the 200 samples of received signals after the largest peak passes through the matched filter. That is, the sensing range of the system is roughly confined to 1 m since the sound of speed is 338 m/s and the chosen sample rate is 44.1 kHz. The sensing range is actually shown to be shorter than this calculated value since the signals reflected from nearby objects are inherently stronger than those from far-away objects. It is understood that the sensing range of the system may be configured to be more or less than one meter and the predefined time at which to truncate the signal can be adjusted accordingly. The results also confirm that this setting can meet most real-life scenarios in terms of accurate location tagging.

In some embodiments, the entire frequency sweep can be divided into four smaller 100-sample segments rather than one 100-sample chirp covering the 11-22 kHz range. This selection reduces the sample duration (also the sensing range), but keeps enough energy at each frequency for the purpose of sensing locations. More or less sample segments are also contemplated by this disclosure.

One additional parameter when selecting emitted sound is the time to wait for playing the next chirp after sending (previous) chirps. This parameter is related to the sensing speed of system. The larger this parameter, the longer the time the system needs for single location sensing. On the other hand, a short wait time causes detection errors since the received signals might accidentally include the reflections of the previous emitted chirp. For example, if the system triggers the next chirp within the 500-th sample shown in FIG. 7, the peaks (i.e., reflections) near the 400-th sample will be added as a noise to the received signals associated with next chirp sensing. From previous field study to identify the surrounding objects via sound reflections, it was found that the speakers and microphones on Galaxy S4 and S5 are able to capture the reflections from objects even 5 m away. This phenomenon can also be found in FIG. 7; there is residual energy even after the 1500-th sample. Thus, the interval between two chirps in the system is preferably set to 4500 samples in one embodiment, making the system's signal sensing time of the entire frequency sweep equal to $4(200+4500)/44100 \cong 0.42$ second. It is understood that other time intervals between two chirps are also contemplated by this disclosure.

Figure 10:
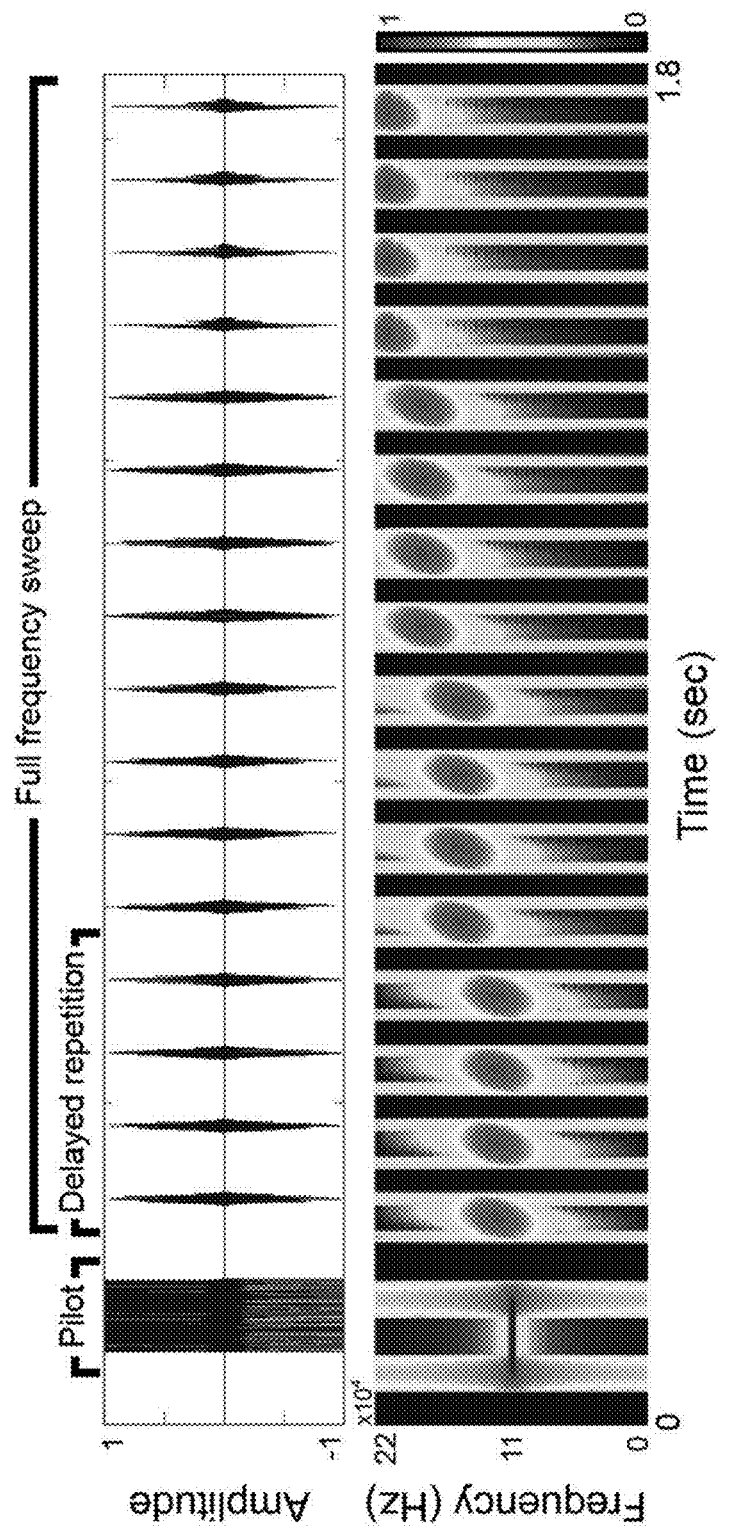
FIG. 10 is a graph depicting a sequence of sounds which comprise an example acoustic signature.

An example implementation of the sensing signals is shown in FIG. 10, where a 500-sample pilot is added before the frequency sweep. This pilot is used for synchronization between speakers and microphones because the speaker and microphone delays are not consistent in commodity phones. One technique for synchronizing a microphone and a speaker is similar to the sample counting process described by Peng, C et. al. in "BeepBeep: A high accuracy acoustic ranging system using cots mobile devices" In Proceedings of ACM SenSys '07, pp 1-14 which is incorporated in its entirety by reference. In one embodiment, this pilot is set as a 11025 Hz tone, which can be improved further by pulse compression, but according to test results, it doesn't contribute any major difference. Another 10000 samples follow the pilot before the chirp signals are played. Note that 4 chirps in the same frequency range are played consecutively before changing to the next frequency range. This repetition is used to enrich the acoustic feature space as described below. Current setting of the location sensing system makes the total sensing time of the system near 2-3 seconds. After testing, most participants were satisfied with this latency in sensing locations. One thing to note is that in the training phase, each trace is collected with 4 cycles of the above-mentioned frequency sweep to eliminate transient noise, consuming about 10 seconds to collect. It is envisioned that other synchronization techniques may be used as well.

Figure 8A:
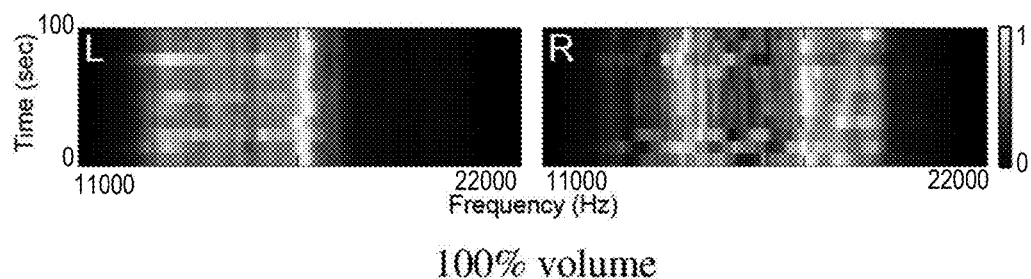
FIGS. 8A-8C are graphs depicting frequency responses at different speaker volumes.
Figure 8B:
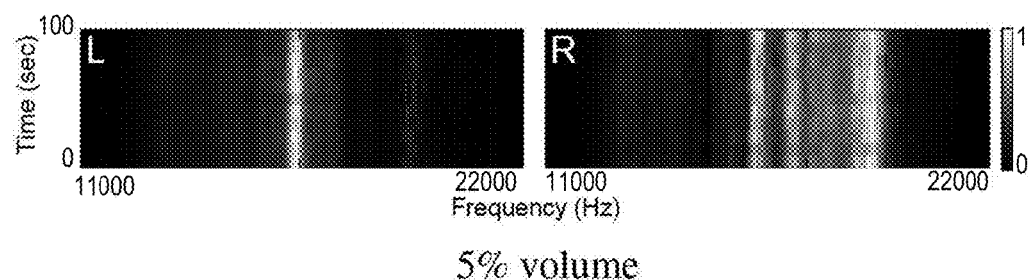
Figure 8C:
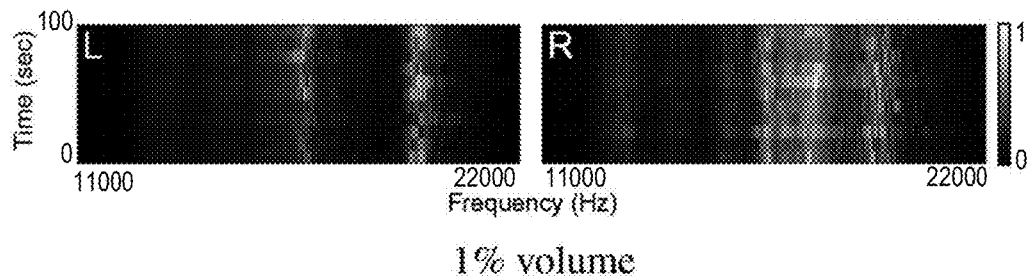

Additionally, the volume of an emitted sound plays a critical role in extracting valid signatures from multipath fading. With reference to FIG. 8, when the volume of emitted sound is full (i.e., 100%), a large portion of the feature space is saturated by the sound emitted directly from the phones' speakers. Moreover, emitting sound in full volume makes the sensing process more annoying to the users since the frequency range used in system is audible. On the other hand, if only 1% of full volume is used to emit sound, the reflections are too weak to be picked up by phones' microphones. Based on our preliminary experiments, setting the phone volume at 5% is found optimal for Galaxy S5. Even though this setting varies from one phone to another, calibration is needed only once to find the optimal setting and will likely fall within the range of five to ten percent of maximum speaker volume.

Figure 9A:
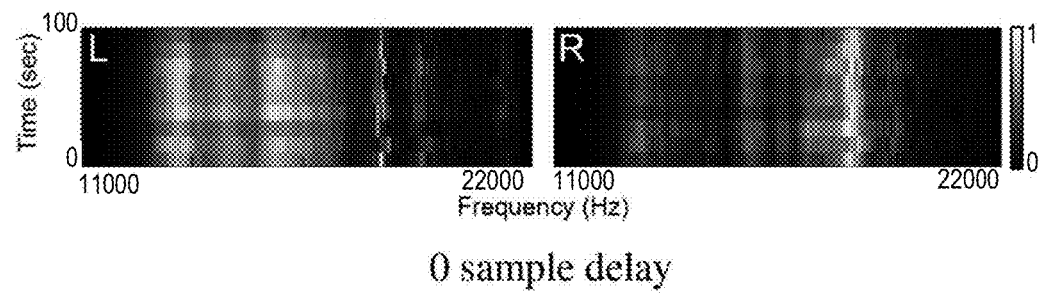
FIGS. 9A-9C are graphs depicting frequency responses with a different delays in the right channel.
Figure 9B:
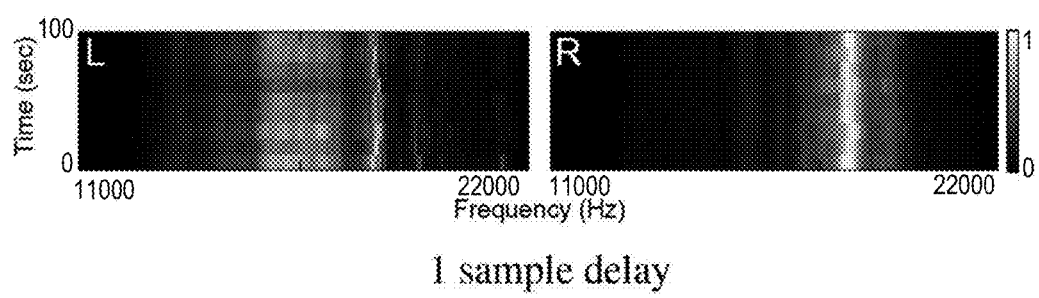
Figure 9C:
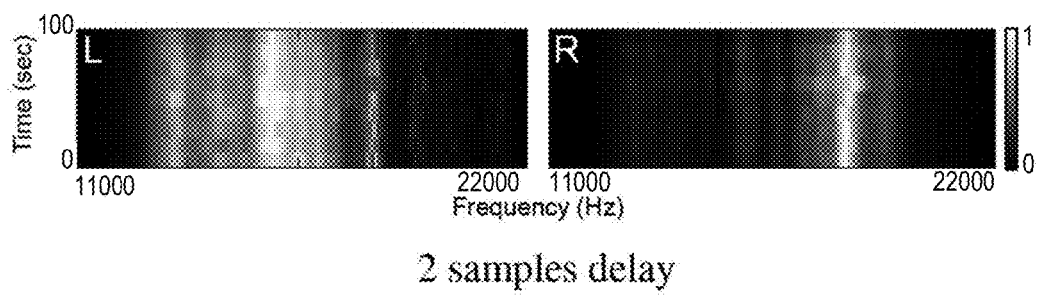

The goal of the location sensing system is to enable accurate location sensing with fine resolution, but according to experimental results, one shot of the frequency sweep between 11 and 22 kHz can distinguish 1 cm apart objects with only 75% accuracy. Another way to enrich the feature space is repeating the emitted sound which can be used to eliminate the interference caused by transient background noise. Instead of only repeating the emitted sound, the proposed system also adds delay of emitted sound in the right channel at each repetition. This intentional delay at the right channel is designed for two purposes. First, when there are stereo speakers in the phone, such as HTC M8 and Sony Z3, this intentional delay behaves similarly to beamforming technology in wireless transmission, which helps us focus on the response in one specific direction at each repetition. This feature was validated to enrich the collected signatures by HTC M8's two front-faced speakers. A similar concept is also adopted in acoustic imaging, but EchoTag doesn't need calibration among speakers because the purpose of this delay is used to enrich the feature space rather than pointing to a predefined target direction. Second, the intentional delay also helps strengthen features at certain frequencies even when there is only one speaker in the phone. The effect of this delay at the right channel can be found in FIG. 9, where different portions of features are highlighted with different delays. Based on the results shown, 4 repetitions with 1 sample delay at the right channel improve EchoTag's sensing accuracy from 75% to 98% in sensing 11 tags, each of which is 1 cm apart from its neighboring tags. This way to enrich the acoustic signature space is unique to EchoTag, since it actively emits sound to sense the environment rather than passively collecting existing features.

Modeling for the sensing resolution is as follows. Suppose two (drawn) tags are at distance d from each other, sensing wavelength is $\lambda$, and the angle from one of the nearby objects toward these two tags is $\theta$. The difference of the reflection's travel distance from this object to the two tagged locations is $\delta = 2d*\cos\theta$. Since the sensing wavelength is $\lambda$, a change, $\delta > \lambda/2$, in any reflection's travel distance will cause the summation of all acoustic reflections to vary from constructive to destructive combing (or vice versa), thus resulting in a significant change in the acoustic signature. So, if $\theta$ of all nearby objects is not close to 0 (which is also rare in the real world), tags separated by more than $\lambda/4$ are to be distinguished by their acoustic signatures. Based on this model, the current setting of proposed system is capable of identifying tags with a 1cm resolution. This evaluation also validates this property as shown in the following sections. However, this fine resolution also implies that users should place their phones close enough to the trained location for collecting valid signatures; this is also the reason why proposed system prefers "drawn" tags to remind users where to place their phones. In a user study, most users didn't have any difficulty in placing phones back at the trained locations with this resolution to activate the functionality of location sensing system.

An acoustic signature for the present location is compared to one or more stored signatures using a classifier. Several classifiers, such as k-nearest neighbors (KNN) and support vector machine (SVM), have been tried for comparing acoustic signatures. Experimental results show that one-against-all SVM performs best in classifying locations. For example, in the experiment of sensing 11 tags 1 cm away from each other based on training data collected 30min before, 98% accuracy can be achieved by SVM while only 65% test data can be correctly classified via KNN with the Euclidean distance and k=5. This may be caused by the small training data size and nonlinear nature of acoustics signatures. For example, a 5 mm position change might incur more significant feature changes (in the frequency domain measured by the Euclidean distance) compared to a 10 mm position change since the acoustic signatures capture the superposition of all reflections.

In the one-against-all SVM, n classifiers are trained if there are n locations to sense. A prediction is made as k if the k-th classifier outputs the highest prediction probability. In a test with 2-fold cross validation, linear kernel achieves the optimal performance. As the results shown later in this disclosure, the difference of prediction probability between classifiers trained at the target location and the other locations is greater than 0.5 in most cases, which is adequate for the proposed system to distinguish locations using acoustic signatures.

Even though activating microphones and speakers is shown to be more economical than image or WiFi sensing, the cost of continuously collecting acoustic signals is still non-negligible and unnecessary. Measurements with Monsoon Power Monitor on Galaxy S5 show that acoustic sensing consumes 800 mW. Moreover, due to the constraints in existing phone microphones, the signals used are still audible, especially for the pieces of frequency sweep close to 10 kHz. The strength of acoustic signal is greatly reduced by lowering the volume, but its continuous use still annoys the users. Further optimizations can be made to reduce the power overhead and user disturbance by avoiding acoustic sensing whenever it is unnecessary. For example, in terms of system functionality, it is useless to sense the environment via acoustic signals when the user keeps the phone in his pocket while walking. This situation can be easily detected by reading inertial sensors. As the system overview shown in FIG. 2, the location sensing system first checks the status of surrounding WiFi to ensure that at least the phones are located in the same target room. Next, the inertial sensor data such as the reading of accelerometers are used to check if the phone is placed with the same angle as recorded in the database. If both the WiFi status and the inertial readings match the recorded data, one shot of acoustic sensing will be activated to check the surrounding acoustic signature. The next round of acoustic sensing can be executed only when the system finds the phones moved and the recorded WiFi beacons and inertial readings match. Note that WiFi sensing in EchoTag incurs minimal overhead, since it needs only connected WiFi SSID, which can be directly retrieved from the data already scanned by Android itself via WifiManager. In the current implementation of EchoTag, tilt monitoring only consumes additional 73 mW in the background and power usage of WiFi is negligible since only the scanned results are used.

In an example embodiment, the location sensing system is implemented as an Android background service. Since the system relies only on sensors commonly available in smartphones, it can be readily implemented on other platforms like iOS or Windows. Acquisitions of active acoustic signatures, tilts, and WiFi signals are implemented with Android API while the classifier relying on LIBSVM is written in C layered by Java Native Interface (JNI). The function to trigger applications, such as setting silent mode or playing music, is implemented via Android Intent class. A prototype of location sensing system was also implemented in iOS with classifiers trained in Matlab. In the current implementation, one round of acoustic sensing (including SVM processing) takes about 4 seconds to accomplish. Most participants in the usability study are satisfied with the current setting.

To evaluate performance, a series of experiments were conducted using Galaxy S5 in two representative scenarios. Certain experiments are also repeated on Galaxy S4/Note3, and iPhone4/5s, but the results are omitted for brevity. The first test environment is a lab/office and the second is a two-floor home. Both scenarios represent real world settings since people usually work or live in either of these two environments. In the lab/office environment, traces were collected while lab members were passing through the test locations and chatting. During the experiment, an active user kept on working (changing the laptop position and having lunch) on the same table. There are two residents living in the home environment, and one of them is unaware of the purpose of our experiments. The residents behave as they used to do daily, such as cooking in the kitchen, watching TV, and cleaning the home. Thus, the evaluation results that include the interference due to human activities should be representative of real-life usage of the proposed location sensing system.

In the lab/office environment, three tag systems are used to evaluate the sensing resolution which is defined as the minimum necessary separation between two tags. The first system is composed of three tags 10 cm apart: A, B, and C. This setting is used to evaluate the basic resolution to support applications of the proposed system (e.g., automatically setting phones to the silent mode). The second and third systems include 11 tags, each of which is 1 cm (30°) apart, which is used to evaluate the maximum sensing resolution of the system. In the home environment, 10 locations are selected. At each location, two tags, A and B, were marked.

In both scenarios, traces are collected at different sampling frequencies and time spans, generating three datasets: 1) 30 min, 2) 1 day, and 3) 1 week. In the 30 min dataset, traces are collected every 5 minutes for 30 minutes, which is used to evaluate the baseline performance of the proposed system without considering the environment changes over a long term. The 1 day dataset is composed of traces collected every 30 minutes during 10 am-10 pm in a day. The purpose of this dataset is to evaluate the performance changes of the proposed system in a single day, which is important for certain applications, such as the silent-mode tag near the bed where the users place their phones every night. The last 1 week dataset is collected over a week, which is used to prove the consistency of active acoustic signatures over a one week period. In the lab/office environment, the 1 week dataset is sampled during 9:00 am-9:00 pm every day while the 1 week dataset in the home environment is tested at 11:00 pm. These experiments validate the effectiveness of the proposed system in real world.

Figure 11A:
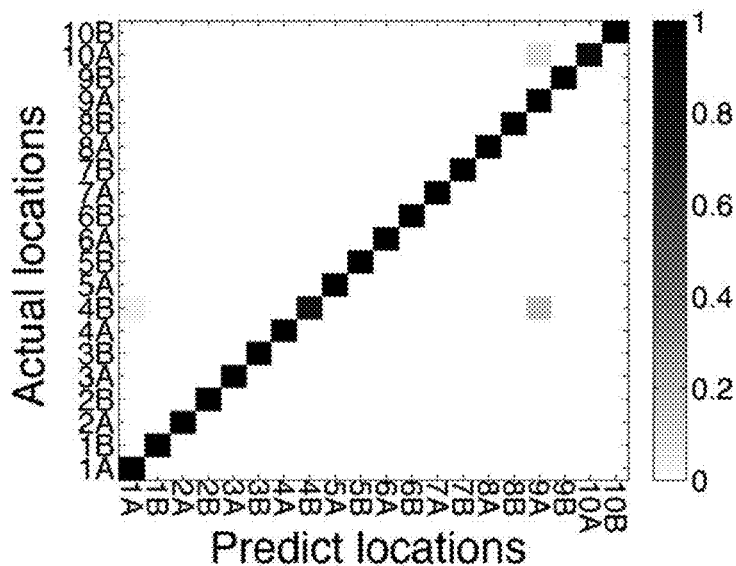
FIGS. 11A and 11B are graphs depicting a confusion matrix and a confidence distribution, respectively, for a thirty minute dataset.

Sensing resolution in the proposed location sensing system is defined as the minimum necessary distance/degree between tags, which is an important metric since it is related to the number of tags that can exist in the same environment. On the other hand, the sensing accuracy at a location is defined as the percentage of correct predictions at that location, whereas the overall accuracy is defined as the average of accuracy at all locations. In the lab/office environment of 30 min dataset, the average sensing accuracy under all settings is higher than 98%. Orientation changes can be detected by EchoTag since the microphones/speakers are not placed in the middle of the phone, and hence the relative position changes when the phone is rotated. EchoTag can also distinguish 20 tags in a home environment with 95% accuracy, the resulting confusion matrix is shown in FIG. 11A. This evaluation based on the 30 min dataset validates that EchoTag can achieve a sensing resolution of 1 cm and at least 30°. Without using any infrastructure, this sensing resolution is the finest among existing methods to differentiate locations. Measurements show that WiFi RSSI or background acoustic noise can only distinguish the 20 tags at home with 30% accuracy.

Figure 11B:
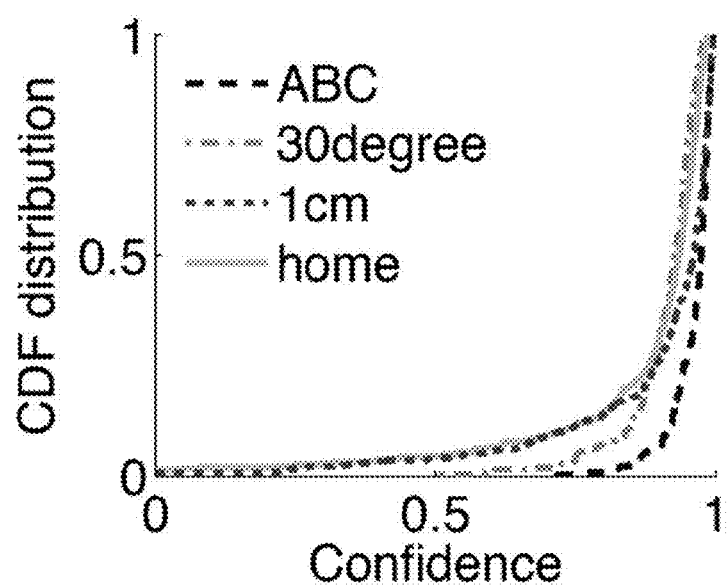

To measure the uniqueness of acoustic signature, a metric called confidence is defined as the prediction probability of the classifier trained at the target location minus the largest prediction probability of classifiers at other locations. A high confidence means high feature uniqueness among locations since SVM gets less confused among locations. A prediction is wrong whenever the confidence is less than 0 because SVM will choose another location with the highest prediction probability as the answer. FIG. 11B shows the confidence distribution of 30 min dataset in all environments. ABC tags get the highest confidence since the tags are separated by more than 10 cm and only 3 tags are considered. However, even 20 tags are set at home or tags in office are separated by only 1 cm (overlapped), acoustic signatures are still different enough to differentiate 90% of cases with confidence greater than 0.5. This example demonstrates that the uniqueness of active acoustic signature is good enough to support the function of EchoTag.

The above-mentioned accuracy represents the true positive rate to differentiate locations. To prevent EchoTag from falsely classifying locations without tags as tagged locations, two more traces are recorded on the same surface but 10 cm away from each tag. These traces are used to build an additional No Tag SVM classifier which determines if the sensed traces belong to one of tagged locations or not. Set 0.5 as the threshold that any sensed location is classified as No Tag when the prediction probability of this classifier is greater than 0.5. In the 30 min dataset of home environment, the probability to classify random locations without tags as tagged locations (i.e. false positive rate) is only 3% and this setting only causes 1% false negative rate. Another test was conducted by deploying the ABC tags on three users' office desks for three days. The users carry their phones as usual but are asked not to place their phones inside the drawn tags. In this test, merely 22 acoustic sensings are triggered per day and only 5% of them are falsely classified as being placed in tags with online-updated classifiers. This rate can be reduced further by fusing other signatures. A manual mode (without any false trigger) in which users can press the home button to manually activate acoustic sensing was also implemented. This manual mode is a reasonable design choice since it is similar to the way Apple Siri or Google Search is triggered.

Figure 12A:
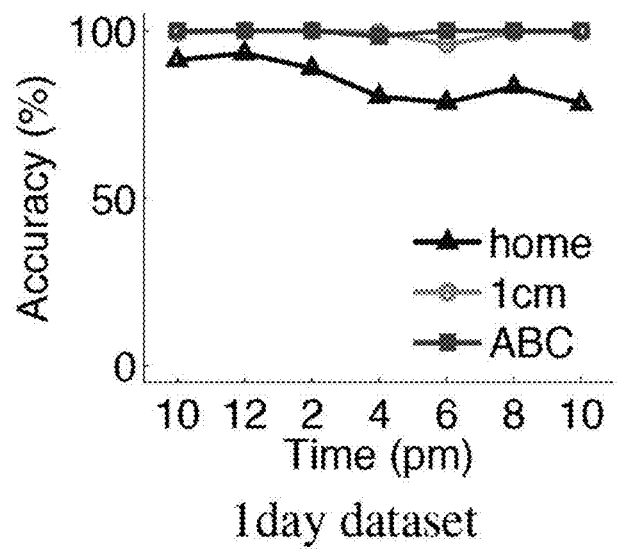
FIGS. 12A and 12B are graphs illustrating accuracy variations over a day and a week, respectively.
Figure 12B:
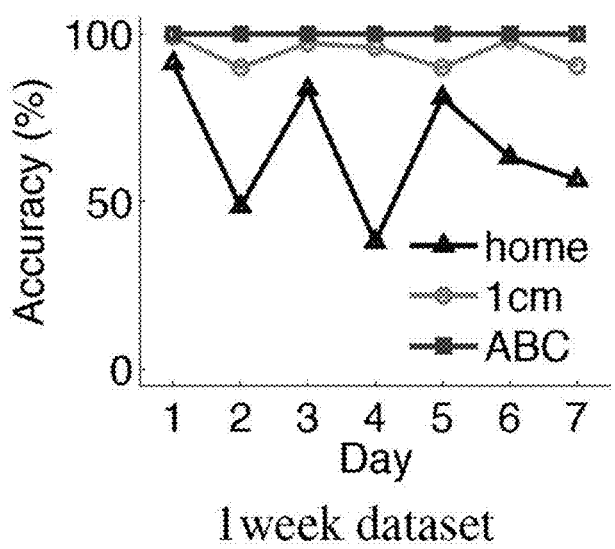

The purpose of this evaluation is to test how active acoustic signatures change over time. This is an important metric since EchoTag is designed to be able to remember the location at least for a certain period of time. To evaluate this, the average accuracy among tags of 1 day and 1 week datasets based on the first 6 traces collected in the first hour or day is shown in FIG. 12. As shown in FIG. 14(a) the decay of active acoustic signatures in one day is not significant. In the lab/office environment, the accuracy drops only by 5% in predicting the traces collected 12 hours later. Even one week later the average accuracy of EchoTag in the lab/office environment is still higher than 90%. However, as shown in FIG. 12, the average accuracy of traces collected in the home environment drops 15% after 12 hours and the traces collected a week later achieve only 56% accuracy. This phenomenon is caused by a series of environment changes at certain locations. For example, the accuracy drops happen mainly at 4 locations: (1) drawer, (4) kitchen, (9) desk, and (10) near the bed which suffer environment changes due to human activities like cooking in the kitchen or taking objects out of drawers. When the above-mentioned objects are excluded from dataset EchoTag can sense the remaining 12 tags at 6 locations with 82% accuracy even a week later. This result suggests where to put tags is critical to EchoTag's performance. When we consider the tags in the kitchen as an example, if the tags are not placed at the original location near cookers and stove but on one of the shelves, the acoustic signatures decay as slowly as at other locations. Providing guidelines for where to put tags is part of our future work.

Figure 13A:
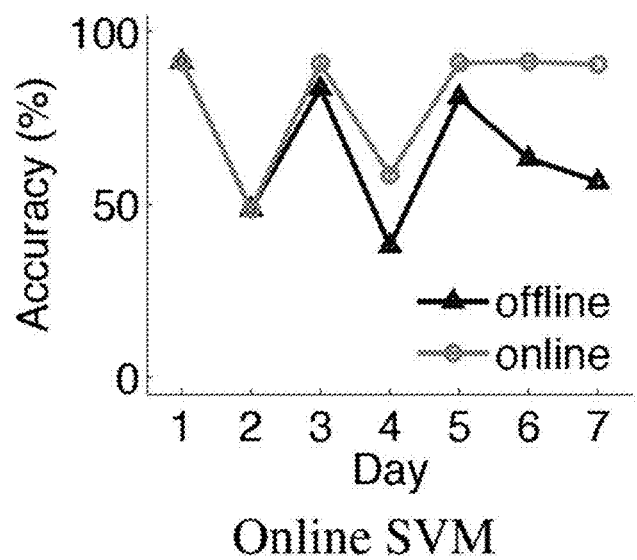
FIGS. 13A and 13B are graphs illustrating performance of an online support vector machine and multiple candidates, respectively.

Sensing accuracy over a long term can be improved further in two ways. The first is to use online SVM training. Simulated online SVM by retraining the offline SVM classifiers with the traces collected before the test day (i.e. excluding the same day test data). The cost of retraining classifiers can be further optimized by online SVM. As the results shown in FIG. 13A with online training, the average accuracy for the home environment in one week can be increased to 91.5% during the last three days. This online training is possible in real world because we assume users will provide feedback, such as selecting the right application/functions when a wrong prediction is made or suspending wrongly-triggered applications. By monitoring this user reaction after each prediction, online training data can be collected during the normal use of EchoTag. Moreover, in our experiments, only 8.5% of error predictions need this user interaction.

Figure 13B:
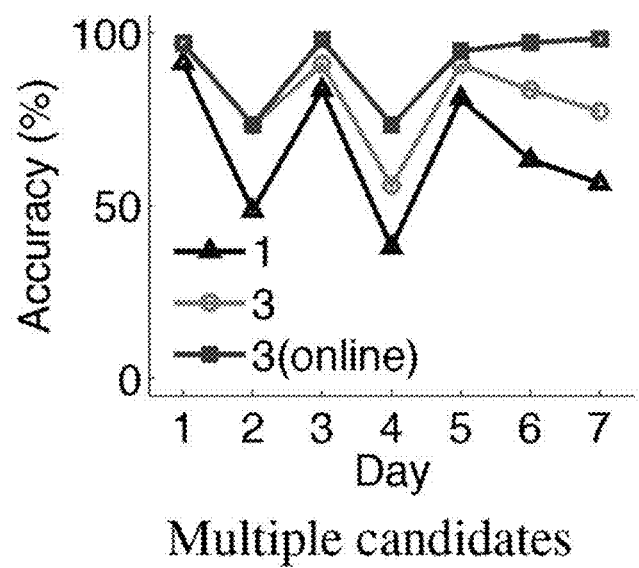

Another way to improve the sensing accuracy over a long term is to provide more than one predicted candidate for users. The candidates in EchoTag are provided based on the prediction probability for each classifier. As shown in FIG. 13B when the first three predicted candidates are provided, the accuracy during the last day based on only the first day trace is increased to 77%. Moreover, providing 3 candidates with online SVM training boosts the accuracy of EchoTag to 98% during the last day.

Figure 14:
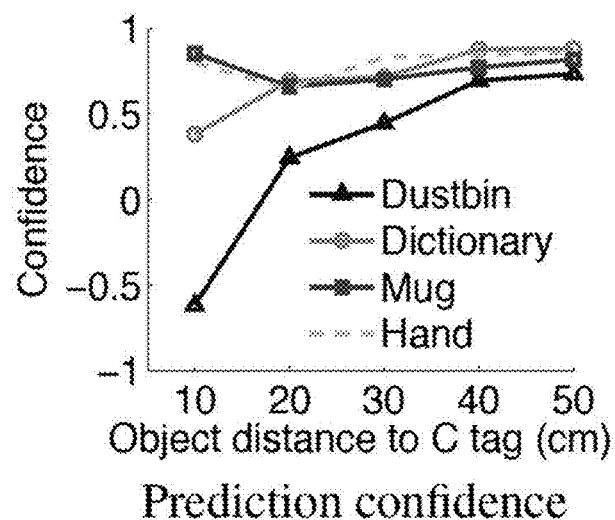
FIG. 14 is a graph depicting prediction confidence for four different environmental objects.

Similar to the signature decay due to significant environmental changes in the kitchen, the performance of EchoTag is investigated when objects near a tagged location are different from those during the training. Four selected objects include: 1) dustbin, 2) dictionary, 3) mug, and 4) human hands. These objects are added sequentially near the ABC tags and vary their distance to the C tag. The corresponding prediction confidence is used to measure the change of EchoTag's performance. As shown in FIG. 14, human hands and small objects like a mug cause little disturbance to EchoTag even when those objects are only 10 cm away from the test locations. Medium-size objects like a thick dictionary degrade EchoTag's confidence to 0.38 when it is close to the test locations, but most predictions still remain correct. Placing large objects like a 15" high dustbin around the test locations change the acoustic signatures significantly since it generates lots of strong acoustic reflections. Most predictions are wrong (i.e., confidence<0) when the dustbin is placed 10 cm away from the test locations. It is also the reason why the accuracy in the kitchen degrades after the position of a large cooker is changed. However, this large environment change is less common in most cases. For example, users may change their mugs or hands frequently but less likely to move large objects on their office desk.

When a large environmental change occurs, EchoTag needs to retrain its classifier to account for this change. One interesting finding from the 1 week trace is that the prediction accuracy in the home environment increased back to 90% after three day classifier online updates. This demonstrates that with enough training data, EchoTag is able to keep only invariant features. It is envisioned that a guideline for setting up tags can be derived and online feedback provided when EchoTag finds more training necessary for certain locations. Another interesting finding is that the (dis) appearance of human causes only limited effect on EchoTag because human body is prone to absorb sound signals rather than reflect them. During experiments, a human body (the tester) continuously changed his relative position to the test locations, but no significant performance degradation was observed in spite of the large human body.

Figure 15A:
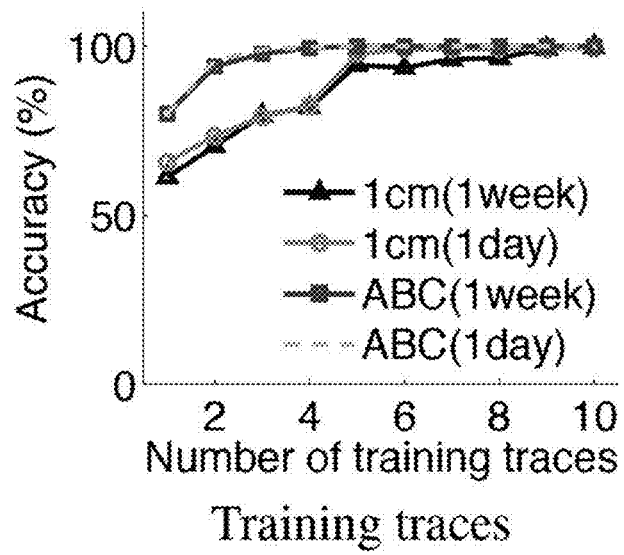
FIGS. 15A and 15B are graphs depicting accuracy of the location sensing depending on the number of training traces and number of delated repetitions, respectively.

Next, the effect of the feature space selected for sensing locations is discussed. First examine accuracy with different training data sizes. The training data size is relevant to the usability of EchoTag since it represents the time required for users to set tags and the number of features necessary to remember a single location. As shown in FIG. 15A, in the lab/office scenario, 2-A traces are able to distinguish rough locations and only 5 traces can achieve 95% accuracy with 1 cm resolution. Considering the tradeoff between training overhead and sensing accuracy, the current version of EchoTag sets the size of training data at a single location to 4. In the usability study, these 4 traces at each tag can be collected in 58 seconds on average. Based on informal experiments with 5 participants on iPhone5s, setting up Apple TouchID required 11-13 training traces with different finger placements, taking about 1 minute.

Figure 15B:
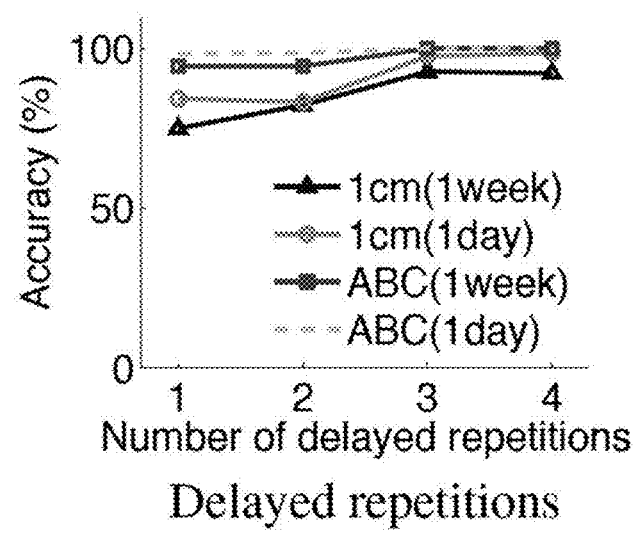

The benefit of the delayed repetitions for sensing locations was also studied. The sensing accuracy based on 5 traces with different numbers of delayed repetitions is plotted in FIG. 15B. As shown in this figure, without help of delayed repetitions to enrich acoustic signatures, the accuracy for 1 cm dataset over a week is only 75% while it can be boosted to 91% when 4 delayed repetitions are used. This way of enriching the feature space is only available in actively acoustic sensing since we have the full control of emitted/collected signals. Also find similar effectiveness of this delayed repetition on phones with stereo speakers like HTC M8, but these results are omitted for brevity. The current version of EchoTag uses 4 delayed repetitions.

Figure 16:
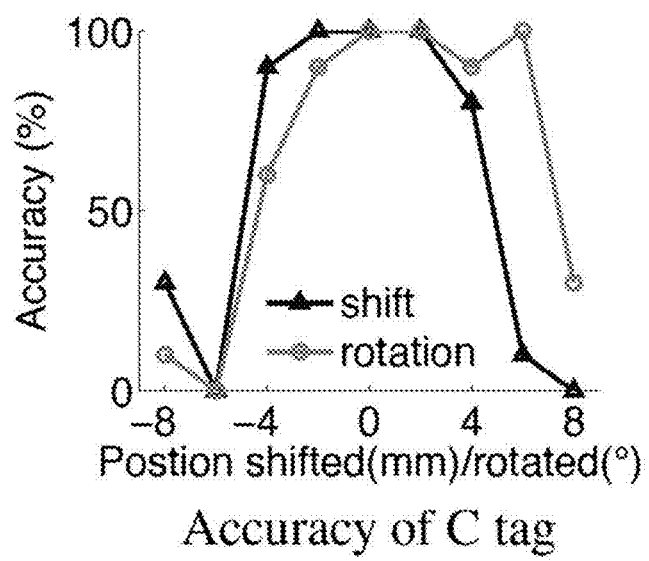
FIG. 16 is a graph depicting accuracy of location sensing within a tolerance range.

Since the phone might not be placed exactly at the same locations as it had been trained, it is important to know the maximum tolerance range of EchoTag and if users can handle the tolerance well. To evaluate the maximum tolerance of EchoTag, additional fine-grained tags are drawn inside the C tag. These fine-grained tags are separated by 2(mm/°). Test data of these inside tags are collected with additional errors (i.e., between ±8 mm/°), and a prediction is made by the first 4 traces of 30 min dataset in the lab/office environment. In the training phase, ABC and 10 cm datasets are combined so the prediction is made for sensing 14 locations. The accuracy of the C tag when test data is collected with additional errors is plotted in FIG. 16 where the maximum tolerance range of EchoTag is about ±4 mm and ±4°. The reason why accuracy with different degree errors is not centered at 0° might be the measurement errors in collecting the training data (i.e., the training data is also collected with a few degree errors). This result also matches the resolution test, where EchoTag can provide 1 cm resolution since features of tags separated by 8 mm change significantly. With the help of drawn tags, this tolerance range is good enough to allow users to put their phones back at the tags for triggering EchoTag. The usability study of 32 participants validates this hypothesis since most of them think it is easy to place phones on the tags. How to enhance the user experience with this limitation of tolerance range is further discussed below.

Figure 17A:
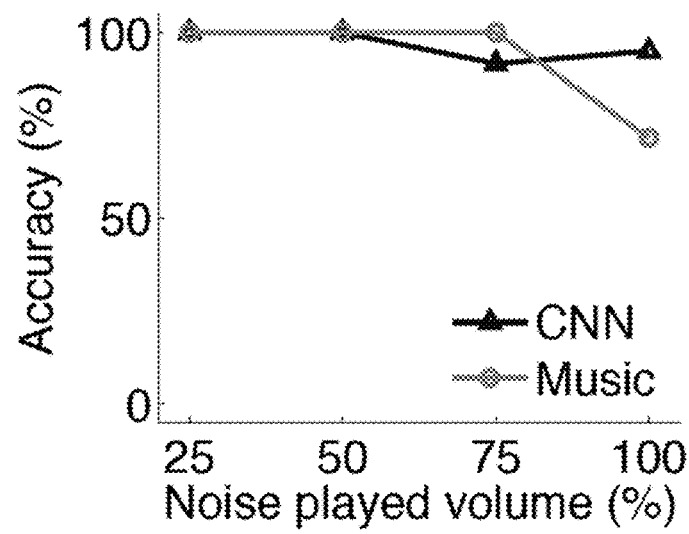
FIGS. 17A and 17B are graphs depicting impact of background noise on the location sensing system.

The last issue of EchoTag to address is ability to sense locations in a noisy environment. Basically, the results discussed thus far were obtained in real-life scenarios where traces were collected in the presence of noises from TV, people chatting, and air condition fans. To further test the robustness against noises, we collected traces in a lab/office environment when a laptop was placed 30 cm away from tags on the same surface. This laptop is set to either play a song ("I'm yours—Jason Marz") or a clip of CNN news with different volumes. The traces of ABC and 1 cm dataset are combined to make prediction for 14 locations. The results of this experiment are shown in FIG. 18. As shown in FIG. 17A, EchoTag can tolerate the music noise with 75% volume and can perform normally even with noise from CNN news with 100% volume. In the measurements, the intensity of noise from the music with 15% volume and CNN news with 100% volume is about 11 dB higher than the office background noise. Even though EchoTag is unable to work accurately (i.e., only 71% among 14 locations) when the music was played with 100% volume, this is not a typical operation scenario of EchoTag since it incurs 11 dB higher noise.

Figure 17B:
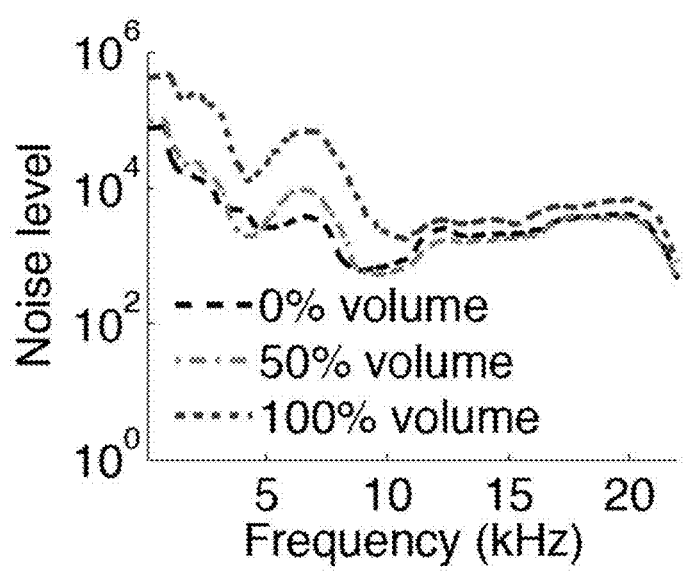

EchoTag is robust to most real-world noises mainly because it relies on signatures actively generated by itself rather than passively collected from background. That is, as the noise profile of CNN news shown in FIG. 17B, most noise from human speaking occurs in frequencies less than 10 kHz while EchoTag uses higher frequencies to sense locations. This phenomenon is also consistent with the results shown in Tarzia, S. et al's "Indoor localization without infrastructure using the acoustic background spectrum", In Proceedings of ACM MobiSys '11, pp. 155-168. The current setting of EchoTag is already resilient to the noise in our usual environment. The usability study done at a noisy location near a cafe also validates the robustness against noise.

In this section, it is explored how real users of EchoTag perceive its performance. For example, we would like to answer a question like "can users easily place phones on drawn tags?" To evaluate the usability of EchoTag, 32 (9 female and 23 male) participants were recruited at our university students' activity center. The test location was the table near a cafe. Participants are randomly selected from those passing by this area. All participants have experience in using smartphones (11 Androids, 19 iPhones, and 2 others). Most participants are university students of age 20-29 while 6 of them are not. The functionality of EchoTag is first introduced to users and its three representative applications. Then, three tags (i.e., turning on silent mode, setting a 45 min timer, and playing music) were deployed at the table. Since the table surface is black and is the university's property, we drew the tags on sheets of 5×6 paper which were then attached on the table. The survey results also validate that drawing tags on attached papers will not affect the accuracy of EchoTag. After users were informed of the purpose of EchoTag, we asked them to put phones on the tags and EchoTag is triggered automatically to make its prediction on combined applications. The participants were asked to first put phones inside the tag for measuring prediction accuracy, and then slightly move the phones away from the tags until a wrong prediction is made for testing the tolerance range of EchoTag. After trying the functionality of EchoTag with the trained tags, the participants were asked to train their own tags. This process helps users "sense" the amount of effort to set up and use EchoTag, indicating the average user training time. The participants then filled out the survey forms. Each study lasted 15-20 min.

TABLE 2

| Questions | Disagree | No option | Agree |
|---|---|---|---|
| Sensing accuracy is useful | 1 | 0 | 31 |
| Sensing noise is acceptable | 0 | 3 | 29 |
| Sensing delay is acceptable | 1 | 6 | 25 |
| Placing phones inside (echo)tags is easy | 0 | 3 | 29 |
| EchoTag can help me remember turning on silent mode when going to sleep | 2 | 5 | 25 |
| EchoTag can help me remember setting the timer for taking washed clothes | 5 | 3 | 24 |
| EchoTag can save my time in activating apps under specific scenarios | 1 | 0 | 31 |

The main results of this usability study are summarized in Table 2 above. 31 of 32 participants think the sensing accuracy of EchoTag is adequate for its intended applications. During this study, three users experienced a bug in our app. In these cases, the whole survey process was restarted and asked the participants to try EchoTag again. The average accuracy including these three buggy traces were 87%, while the results excluding these three cases were 92%). One thing to note is that even though three users experienced the low sensing accuracy during the first trial, the overall detection accuracy of EchoTag is acceptable and useful. Moreover, 25 of the participants think the prediction delay is acceptable for the purpose of EchoTag. In another question to learn their expectation of EchoTag, only 2 of users hope to have the sensing delay less than 1 second and 12 users hope the sensing delay can be shortened to about 2 seconds.

Based on participants' experience in placing phones on tags, 29 of them think it is easy to do. Five participants put their phones too far away from the drawn tags during the first trial, but they were able to place their phones on the tags after they were told of it. Only one participant made a comment that he expected a larger tolerance range. Actually, there is an inherent tradeoff between the tolerance range and the training overhead. For example, a very long training sequence that moves phones at all possible locations near the drawn tags can increase the tolerance range, but with a significant overhead in the training phase. In the current version of EchoTag, four repetitions are used in the training phase to collect signatures at a single location. Between two consecutive repetitions, the phones need to be taken away from, and then placed back on tags for sensing valid signatures. On average, users need 58 seconds to finish the whole training phase for a tag. 8 participants expected less than 2 training repetitions at each location, while 17 of participants think the 4 repetitions setting is reasonable since it is only one-time training. Considering this trade-off between accuracy, tolerance, and training overhead, the existing setting of EchoTag can satisfy most scenarios and users.

In the survey questions related to potential scenarios based on EchoTag, 25 participants agree the silent mode tag can help them remember setting phones to stay quiet during sleep, and 24 of them agree the auto-timer scenario can help them take clothes out of a washing machine. These results indicate that the users see benefits from EchoTag in remembering things to do in specific situations since the functionality of EchoTag provides natural connections between the locations and things-to-do. Moreover, 31 participants also think the automation of triggered applications can save time in finding target applications.

Similar to those applications mentioned above, participants also suggest use of an auto-set timer during cooking or auto-set silent mode in an office environment. These applications can be classified into two categories based on the resulting benefits: 1) helping users remember things and 2) saving time for users in finding expected applications. For example, applications like auto-set silent mode do not save a significant amount of time since pressing a phone's power button can also set up silent mode manually. However, this function turns out to receive most support from the participants because it is easy to forget setting silent mode before going to bed everyday. Instead of doing it manually, a natural combination of a location (i.e., a tag near bed) and target applications/functions (i.e., silent mode) helps users remember them more easily. Other suggested applications like automatically turning off lights or activating a special app for monitoring the sleep behavior are also in this category. On the other hand, the applications like automatically playing favorite songs (movies) on speakers (TV) help users find the expected applications/functions with less time due to the hint of tagged locations. For example, feedback stated that EchoTag can be used to set up Google Map and activate the car mode when a tag is placed inside the car (e.g., an iPhone stand). Actually, this task can be easily remembered whenever the user gets into his car, but it is time-consuming to find and enable these applications. In this scenario, the natural combination of locations and applications can help users filter out unnecessary information and save their time in triggering the desired applications.

As shown above, the merit of EchoTag's fine resolution comes with the limitation that the tolerance range of current setting is about 0.4 cm. Even though most participants in the user study were able to place phones at the tagged locations accurately after they were instructed on how to use EchoTag, this fine resolution and its limited tolerance range may not be needed for certain applications and cause unintended prediction errors when the phone is not placed correctly. To meet such applications needs, one can take the following two approaches.

Figure 18A:
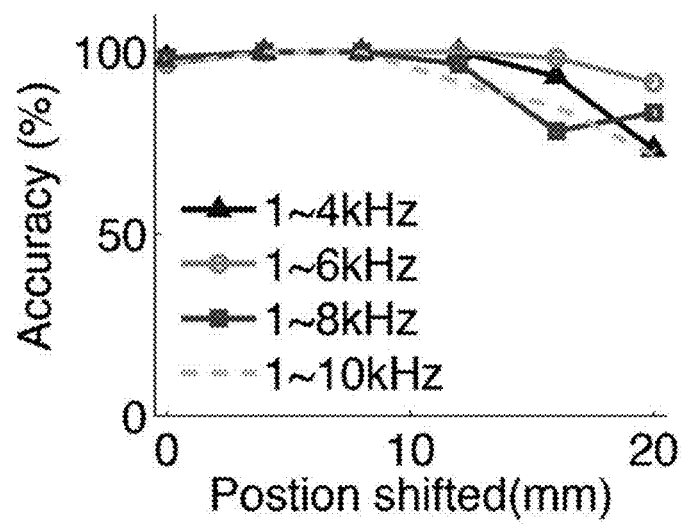
FIGS. 18A and 18B are graphs depicting the extension of tolerance range in the location sensing system.

First, enlarge the tolerance range of EchoTag (while decreasing its sensing resolution). Based on the mathematical model discussed earlier, we can lower the sensing frequency to extend the tolerance range. For example, setting the highest sensing frequency to 6 kHz can increase the tolerance range from 0.4 cm to about 1.4 cm. This increase of tolerance range is plotted in FIG. 18A, showing that lower-frequency signals are better in identifying tags with large placement errors. However, lowering sensing frequency will increase the audibility of sensing signal and decrease the feature space. For example, sensing with 1~4 kHz lowers overall accuracy because the collected signature is not enough to be distinguished from others.

Figure 18B:
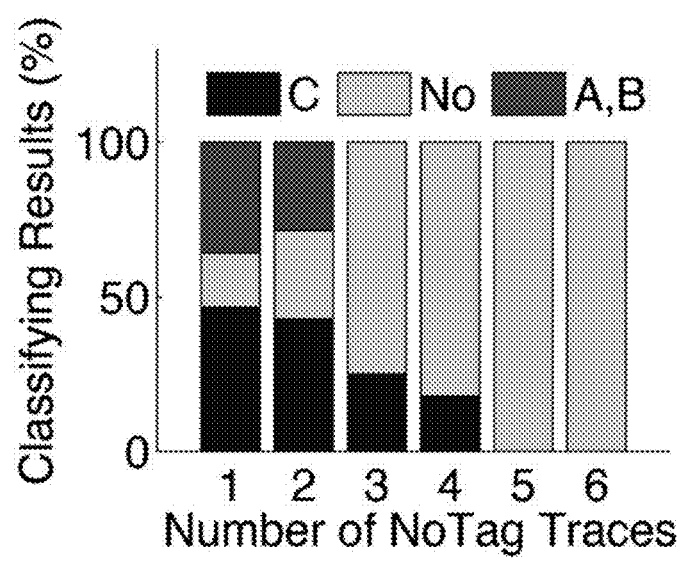

Second, instead of trying to classify misplacements as trained tags, EchoTag can opt to report "There is no tag" once the location is out of the tag's tolerance range. We choose to use the same 'NoTagSVM' classifier as introduced earlier, which is built from traces in the same surface but at least 0.4 cm away from the tags. That is, EchoTag identified locations as "There is no tag" if the trace gets the prediction probability of NoTag classifier which is greater than 0.3 and also larger than the prediction probability of other classifiers. With this method, if the user places his phone outside of the operation range of EchoTag, the message of "There is no tag" (rather than identifying a wrong tag and then triggering a wrong function) will tell the user he needs to place the phone more precisely to activate the tagged function. The result of the same experiment of identifying C tag with traces collected 0.4 cm away from the trained location is shown in FIG. 18B. Without the help of 'NoTag' classifier, 50% of those misplaced traces around the C tag were classified as wrong tags. Note that NoTag SVM with 6 training traces in this experiment only causes 1% false negatives when the trade is collected at the right location (within the tolerance range), which also matches the result reported earlier.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for actively sensing location of a mobile device, comprising:
    determining, by the mobile device, an approximate location of a mobile device using a location service residing on the mobile device;
    comparing, by the mobile device, the approximate location of the mobile device to one or more tagged locations stored by the mobile device, each tagged location includes an acoustic signature for the tagged location and a function to be performed at the tagged location;
    generating, by the mobile device, acoustic signals with a speaker of the mobile device, where the generation of acoustic signals occurs in response to the approximate location of the mobile device matching one of the tagged locations stored by the mobile device;
    recording, by the mobile device, sounds using a microphone of the mobile device and thereby create an acoustic signature for present location of the mobile device, where the recordation of sounds occurs in response to generating acoustic signals;
    comparing, by the mobile device, the acoustic signature for the present location of the mobile device with the acoustic signature associated with the tagged locations stored by the mobile device; and
    performing, by the mobile device, a given function associated with a given stored acoustic signature, where the performing occurs in response to the acoustic signature for the present location of the mobile device matching the given stored acoustic signature.

2. The method of claim 1 wherein determining an approximate location further comprises using an identifier for a wireless local area network to which the mobile device is paired with.

3. The method of claim 1 wherein determining an approximate location further comprises determining orientation of the mobile device using an accelerometer residing in the mobile device.

4. The method of claim 1 wherein generating acoustic signals further comprises sweeping frequency of the acoustic signals generated by the speaker across a range of frequencies.

5. The method of claim 4 wherein generating acoustic signals further comprises sweeping frequency of the acoustic signals in the range of 11 kHz to 22 kHz.

6. The method of claim 1 further comprises generating acoustic signals with volume of the speaker set at five to ten percent of maximum volume of the speaker.

7. The method of claim 1 further comprises generating acoustic signals using two audio channels, where acoustic signal in one of the two audio channels is delayed in relation to the other channel.

8. The method of claim 1 wherein creating an acoustic signature for present location further comprises
    filtering, by the mobile device, the recorded sounds in time domain and thereby generate a filtered signal;
    identifying, by the mobile device, in time domain largest peak in the filtered signal; and
    truncating the recorded sounds in time domain and thereby create an acoustic signature for present location of the mobile device, where the recorded sounds is truncated prior to the largest peak identified in the recorded sounds and is truncated after a predefined time period following the largest peak identified in the filtered signal.

9. The method of claim 8 wherein duration of the predefined time period is selected to exclude sound reflections from object outside a fixed distance from the mobile device.

10. The method of claim 1 wherein performing a given function includes placing the mobile device in silent mode.

11. The method of claim 1 further comprises presenting a message on a display of the mobile device, where the presentation occurs when the approximate location of the mobile device does not match on of the tagged locations stored by the mobile device.

12. A method for actively sensing location of a mobile device, comprising:
    generating, by the mobile device, acoustic signals with a speaker of the mobile device;
    recording, by the mobile device, sounds using a microphone of the mobile device, where the recordation of sounds occurs in response to generating acoustic signals;
    filtering, by the mobile device, the recorded sounds in time domain and thereby generate a filtered signal;
    identifying, by the mobile device, in time domain largest peak in the filtered signal;
    truncating the recorded sounds in time domain and thereby create an acoustic signature for present location of the mobile device, where the recorded sounds are truncated prior to the largest peak identified in the filtered signal and is truncated after a predefined time period following the largest peak identified in the filtered signal;
    comparing, by the mobile device, the acoustic signature for the present location of the mobile device one or more acoustic signatures stored by the mobile device; and
    performing, by the mobile device, a given function associated with a given acoustic signature, where the performing occurs in response to the acoustic signal for the present location matching the given acoustic signature and the given acoustic signature is one of the acoustic signatures stored by the mobile device.

13. The method of claim 12 further comprises
    determining, by the mobile device, an approximate location of a mobile device using a location service residing on the mobile device; and
    comparing, by the mobile device, the approximate location of the mobile device to one or more tagged locations stored by the mobile device, each tagged location is associated with one of the acoustic signatures stored by the mobile device.

14. The method of claim 12 wherein generating acoustic signals further comprises sweeping frequency of the acoustic signals generated by the speaker across a range of frequencies.

15. The method of claim 14 wherein generating acoustic signals further comprises sweeping frequency of the acoustic signals in the range of 11 kHz to 22 kHz.

16. The method of claim 12 further comprises generating acoustic signals with volume of the speaker set at five to ten percent of maximum volume of the speaker.

17. The method of claim 12 further comprises generating acoustic signals using two audio channels, where acoustic signal in one of the two audio channels is delayed in relation to the other channel.

18. The method of claim 12 wherein duration of the predefined time period is selected to exclude sound reflections from object outside a fixed distance from the mobile device.

19. The method of claim 18 wherein the fixed distance is on the order of one meter.

20. The method of claim 12 wherein the recorded sounds are filtered in time domain using a matched filter.

\* \* \* \* \*